(12) United States Patent
Pilarz et al.

(10) Patent No.: US 12,366,483 B2
(45) Date of Patent: *Jul. 22, 2025

(54) WAVEFRONT SENSORS WITH IRREGULAR APERTURE MASKS, DIFFUSERS, AND CAMERAS, AND METHODS OF MAKING AND USING THE SAME

(71) Applicant: Quartus Engineering Incorporated, San Diego, CA (US)

(72) Inventors: Peter Pilarz, San Diego, CA (US); Jason Kuhn, San Diego, CA (US); Brian Dunne, San Diego, CA (US); Jesse Melrose, San Diego, CA (US)

(73) Assignee: Quartus Engineering Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/938,201

(22) Filed: Nov. 5, 2024

(65) Prior Publication Data
US 2025/0060254 A1 Feb. 20, 2025

Related U.S. Application Data

(63) Continuation of application No. 18/256,413, filed as application No. PCT/US2021/063348 on Dec. 14, 2021, now Pat. No. 12,181,347.
(Continued)

(51) Int. Cl.
*G01J 1/20* (2006.01)
*G01J 9/00* (2006.01)
(Continued)

(52) U.S. Cl.
CPC .............. *G01J 9/00* (2013.01); *G06T 7/0002* (2013.01); *G06T 7/66* (2017.01); *G06T 7/70* (2017.01); *G06T 7/80* (2017.01)

(58) Field of Classification Search
CPC ....... G01J 9/00; G01J 9/02; G01J 1/20; G06T 7/80; G06T 7/66; G06T 7/70; G06T 7/0002
(Continued)

(56) References Cited

U.S. PATENT DOCUMENTS

| 5,629,765 A | 5/1997 | Schmutz |
| 5,825,476 A | 10/1998 | Abitol |

(Continued)

FOREIGN PATENT DOCUMENTS

| DE | 19919020 C1 | 1/2001 |
| JP | H0915057 A | 1/1997 |

(Continued)

OTHER PUBLICATIONS

International Search Report and Written Opinion for PCT/US2022/063348 dated Mar. 16, 2022; 14 pages.
(Continued)

*Primary Examiner* — Trang U Tran
(74) *Attorney, Agent, or Firm* — Snell & Wilmer L.L.P.

(57) ABSTRACT

A wavefront sensor for measuring a wavefront that includes an aperture mask configured to receive incident light, the aperture mask comprising a plurality of apertures irregularly spaced and arranged in a plurality of sub-windows that respectively transmit sub-beams of the incident light. A diffuser can receive the sub-beams transmitted by the plurality of apertures. A controller of the sensor is configured to identify measured sub-beams by convolving the sub-beams imaged on the diffuser with a map of the plurality of apertures; and measure the wavefront of the incident light based on changes in position of the sub-beams in a digital image of the diffuser relative to both reference positions and neighboring sub-beams.

19 Claims, 17 Drawing Sheets

Related U.S. Application Data

(60) Provisional application No. 63/125,742, filed on Dec. 15, 2020.

(51) Int. Cl.
  *G06T 7/00* (2017.01)
  *G06T 7/66* (2017.01)
  *G06T 7/70* (2017.01)
  *G06T 7/80* (2017.01)

(58) Field of Classification Search
  USPC .......................................................... 348/135
  See application file for complete search history.

(56) References Cited

U.S. PATENT DOCUMENTS

| | | |
|---|---|---|
| 6,300,073 B1 | 10/2001 | Zhao et al. |
| 6,548,797 B1 * | 4/2003 | Ai .............................. G01J 9/00 356/121 |
| 6,563,947 B1 | 5/2003 | Droste |
| 6,570,143 B1 | 5/2003 | Neil |
| 7,365,838 B2 | 4/2008 | Jones |
| 7,414,712 B2 | 8/2008 | Yoon |
| 7,988,290 B2 * | 8/2011 | Campbell ............. G01B 11/25 351/212 |
| 8,558,996 B2 | 10/2013 | Otaki |
| 9,679,360 B2 * | 6/2017 | Fleischer .................. G01J 9/00 |
| 10,648,919 B2 | 5/2020 | Witte |
| 2014/0125860 A1 | 5/2014 | Tofsted |
| 2018/0324359 A1 | 11/2018 | Pan |
| 2019/0265107 A1 | 8/2019 | Wang |

FOREIGN PATENT DOCUMENTS

| | | |
|---|---|---|
| WO | 2000017612 A1 | 3/2000 |
| WO | 2018083573 A1 | 5/2019 |

OTHER PUBLICATIONS

Kuhn et al., "Measurement and Analysis of Wavefront Deviations and Distortions by Freeform Optical See-Through Head Mounted Displays," Retrieved from the Internet: URL:https://www.proquest.com/docview/1803563511?pq-origsite=gscholar&fromopenview=true XP055898230 [retrieved on Mar. 7, 2022] pp. 43,49; figure 21 (Dec. 31, 2016).

* cited by examiner

Defocus/Power Fringes

Tilt Fringes

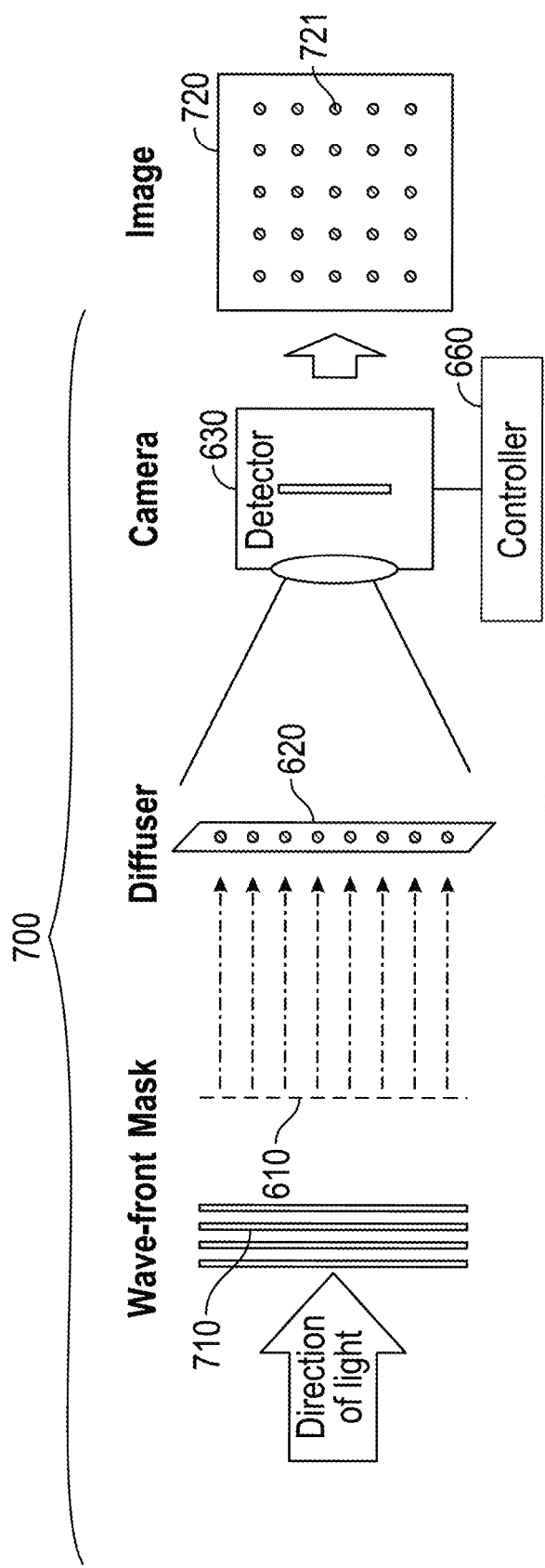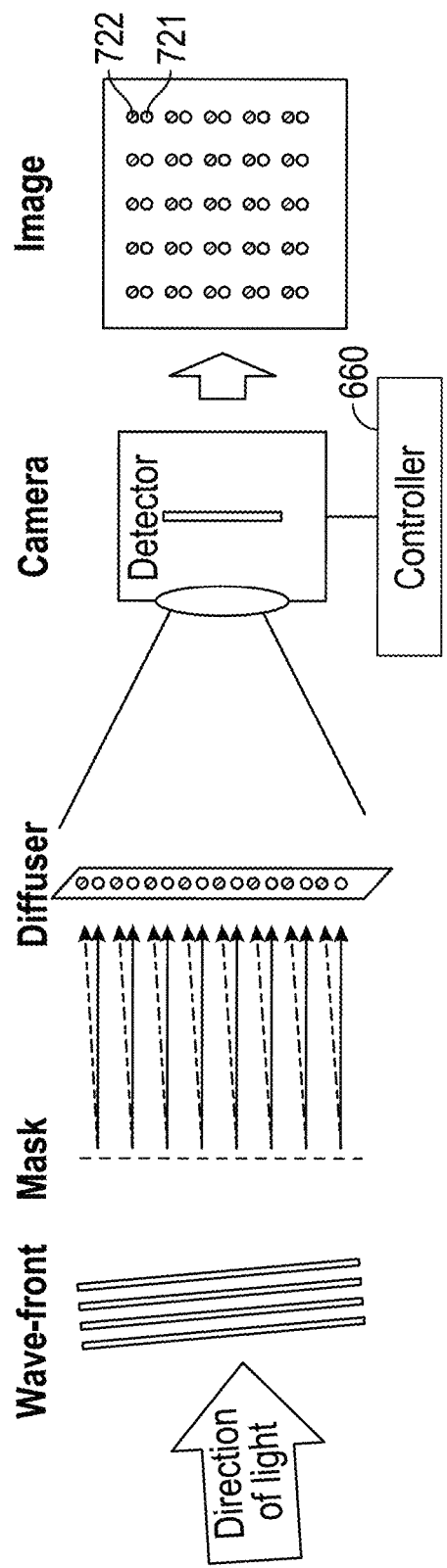
FIG. 7A
FIG. 7B

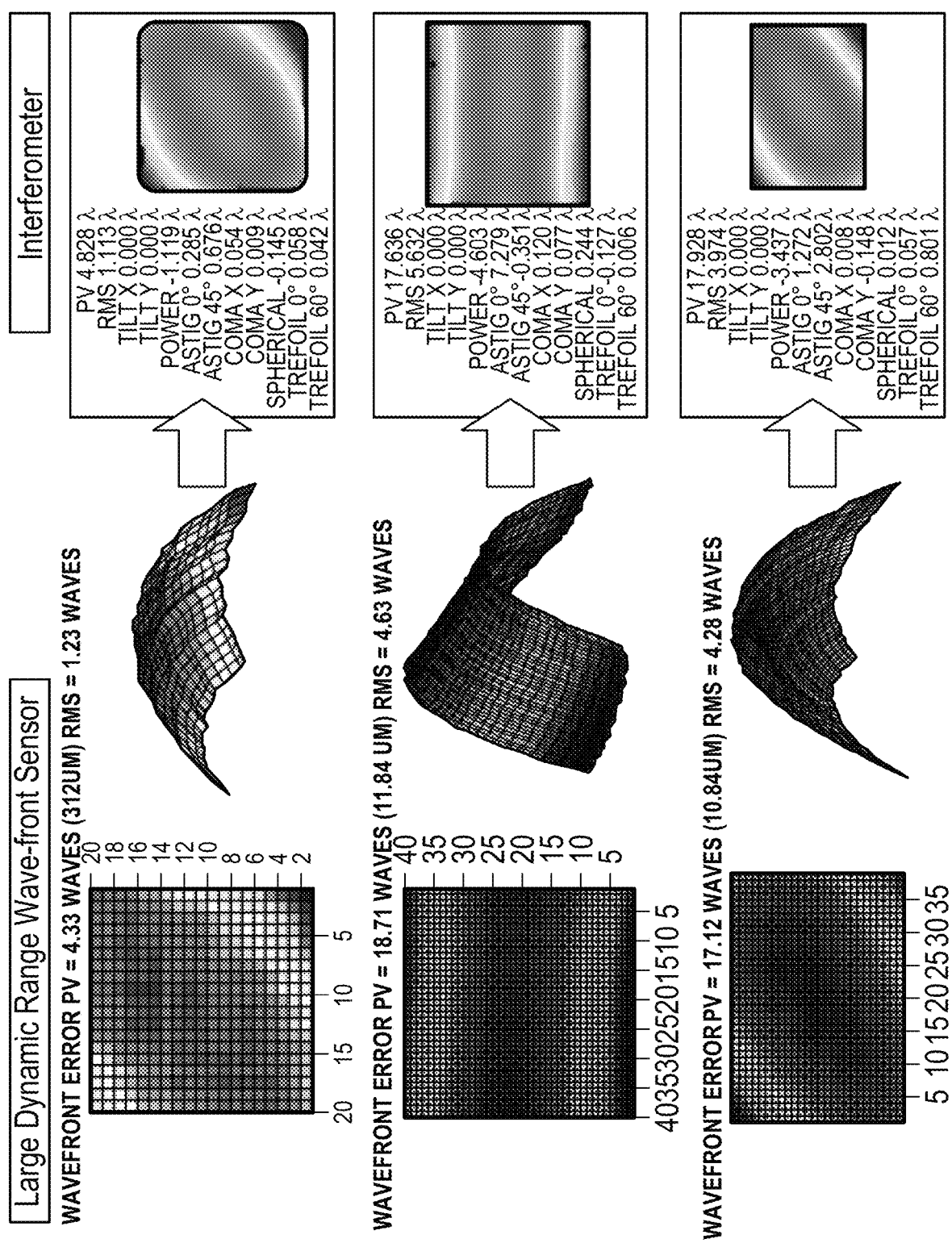

WAVEFRONT SENSORS WITH IRREGULAR APERTURE MASKS, DIFFUSERS, AND CAMERAS, AND METHODS OF MAKING AND USING THE SAME

CROSS-REFERENCE TO RELATED APPLICATIONS

This application is a continuation of U.S. application Ser. No. 18/256,413, filed Jun. 7, 2023 entitled "WAVEFRONT SENSORS WITH IRREGULAR APERTURE MASKS, DIFFUSERS, AND CAMERAS, AND METHODS OF MAKING AND USING THE SAME" which is a United States national stage application of International Application No. PCT/US21/63348 filed Dec. 14, 2021, which claims the benefit of U.S. Provisional Patent Application No. 63/125, 742, filed Dec. 15, 2020 and entitled "WAVEFRONT SENSOR," the entire contents of which are incorporated by reference herein.

FIELD

This application generally relates to wavefront sensors.

BACKGROUND

Wavefront sensors are widely used across in the optics industry for a variety of applications. For example, wavefront sensors are used for measuring and characterizing optical wavefronts, measuring optical surface figures and imperfections, and/or aligning optical systems.

Wavefront sensors, at their core, measure the slope of incident light's wavefront. By measuring the slope of sub-regions of the beam, the beam's wavefront can be reconstructed and characterized. Depending on the magnitude of slopes, and the characteristics of the beams, there are various methods of measuring wavefront. However, common limitations of many wavefront sensors include their inability to easily and accurately measure a large range of wavefront errors, regardless of the beam's overall tilt, diameter, wavelength, and coherence.

For example, interferometry uses constructive and destructive interference to measure optical path difference (OPD). The pattern created when the reference beam and measurement beam interfere can provide a topographical map of the difference between the reference and measurement beams. FIGS. 1A and 1B schematically illustrate example interferometer layouts, and FIGS. 2A and 2B illustrate example interference patterns that may be obtained using interferometers such as illustrated in FIGS. 1A and 1B. Interferometers allow for very accurate OPD measurements, but generally have limited measurement range. For example, if the measurement beam is too aberrated, the Interferometer's sensor may be unable to resolve the interferogram fringes. For example, this may happen if the beam has too much defocus, potentially causing the interferogram's concentric fringes to be too dense to resolve. Likewise, if the measurement beam is not on-axis, or nulled, with the reference beam, the interferogram's tilt fringes may become too dense to solve. It is for this reason that the measurement beam generally needs to be well-aligned with the interferometer's reference beam to eliminate tilt fringes and achieve optimal resolution.

As another example, Shack-Hartmann sensors utilize a lenslet array to focus sub-regions of the wavefront directly into a detector. FIGS. 3A-3B schematically illustrate use of a Shack-Hartmann sensor to detect planar and aberrated wavefronts, respectively. The tilt of a wavefront sub-region can be determined based on the position of each focused spot on its respective sub-array. In general, Shack-Hartmann sensors do not rely on interference patterns, therefore a reference beam is typically not necessary. The wavefront and light source usually originate from outside the system, which may make Shack-Hartmann sensors advantageous and convenient solutions in certain applications, in addition to being very sensitive.

However, there can be some limitations to the Shack-Hartmann type of wavefront sensor. For example, the measurement range may be limited by the size of the detector sub-arrays. A distorted wavefront may displace the focal spots on the detector with respect to their perfect reference positions. If the wavefront is too distorted, focal spots can displace so much as to miss their respective sub-array entirely, or can overlap with neighboring spots. To increase the measurement range, the diameter of the lenslets could be increased at the expense of resolution due to a reduced number of data points. Alternatively, reducing the focal length of the lenslets would increase range, but would reduce overall measurement sensitivity. An additional limitation of Shack-Hartmann sensors is the maximum acceptable beam diameters. The aperture of these systems is generally driven by the lenslet size and detector size. Depending on measurement beam diameter, the required aperture can lead to prohibitively expensive or unrealistic lenslet arrays and detectors sizes.

As another example, autocollimators are generally used to measure angles of incident light. They are often used to align optical components or measure angle differences in optical systems. FIG. 4 schematically illustrates an example autocollimator. Autocollimators reflect a collimated beam off the measurement surface and focus the returned beam onto a detector. The displacement of the spot relative to the reference position is a function of the measurement surface's tilt. This enables the autocollimator to very precisely measure angles of incident light, and therefore the angle of surface being measured. While an autocollimator is very accurate at measuring relatively small angles, the measurement range can be a limitation, and is driven by the focal length of the lens and detector size. Reducing the focal length would increase the field of view (FOV) and measurement range, but would also reduce the sensitivity of the measurement. The lens and detector size can be increased to increase FOV, measurement range, and aperture. But this can become prohibitively expensive and unrealistic for relatively large measurement range, or beams with large diameters, or beams that may move around the aperture.

Accordingly, there is a need for improved wavefront sensors.

SUMMARY

Wavefront sensors with irregular aperture masks, diffusers, and cameras, and methods of making and using the same, are provided herein.

Some examples herein provide a wavefront sensor for measuring a wavefront. The sensor may include an aperture mask configured to receive incident light the wavefront of which is to be measured and including irregularly spaced apertures that respectively transmit sub-beams of the incident light. The sensor may include a diffuser configured to receive the sub-beams transmitted by irregularly spaced apertures of the aperture mask. The sensor may include a camera having a focal plane in which the diffuser substantially is located. The camera may be configured to obtain a digital image of the diffuser and thus to obtain a digital image of the incident light the sub-beams of which the aperture mask transmits onto the diffuser. The sensor may include a controller configured to electronically receive the digital image of the diffuser and to measure the wavefront of the incident light based on the digital image.

In some examples, the sensor further includes a source of collimated light having the wavefront. In some examples, the source of collimated light includes a laser. In some examples, the sensor further includes a beamsplitter configured to reflect light from the source to a surface the wavefront from which is to be measured, to receive light that is reflected, diffused, or diffracted by the surface, and to transmit such light which then is incident on the mask.

In some examples, the mask is configured to receive light that is transmitted by an optical component generating the wavefront to be measured.

In some examples, the controller is configured to measure the wavefront based on positions of the sub-beams on the diffuser relative to both respective reference positions and neighboring sub-beams.

In some examples, the controller is configured to detect sub-beam centroids in the digital image and undistort the sub-beam centroids using an intrinsic camera calibration.

In some examples, the controller is configured to identify respective sub-beams in the digital image by their unique code created.

In some examples, the controller is configured to determine a null position of each sub-beam and to calculate each sub-beam's displacement from its null position.

In some examples, the controller is configured to convolve sub-beams imaged on the diffuser with a map of the irregularly spaced apertures of the mask to identify the measured sub-beams.

In some examples, the controller is configured to measure a tilt of the incident light. In some examples, the tilt is an average tilt.

In some examples, the controller is configured to measure a wavefront error of the incident light.

Some examples herein provide a method for measuring a wavefront. The method may include, at an aperture mask, receiving incident light the wavefront of which is to be measured. The aperture mask may include irregularly spaced apertures that respectively transmit sub-beams of the incident light. The method may include, at a diffuser, receiving the sub-beams transmitted by irregularly spaced apertures of the aperture mask. The method may include obtaining a digital image of the diffuser and thus obtaining a digital image of the incident light the sub-beams of which the aperture mask transmits onto the diffuser. The method may include measuring the wavefront of the incident light based on the digital image.

In some examples, the method further includes generating collimated light having the wavefront. In some examples, the source of collimated light includes a laser. In some examples, the method further includes using a beamsplitter to reflect light from the source to a surface the wavefront from which is to be measured, to receive light that is reflected, diffused, or diffracted by the surface, and to transmit such light which then is incident on the mask.

In some examples, the mask receives light that is transmitted by an optical component generating the wavefront to be measured.

In some examples, the wavefront is measured based on positions of the sub-beams on the diffuser relative to both respective reference positions and neighboring sub-beams.

In some examples, measuring the wavefront includes detecting sub-beam centroids in the digital image and undistorting the sub-beam centroids using an intrinsic camera calibration.

In some examples, measuring the wavefront includes identifying respective sub-beams in the digital image by their unique code created.

In some examples, measuring the wavefront includes determining a null position of each sub-beam and calculating each sub-beam's displacement from its null position.

In some examples, measuring the wavefront includes convolving sub-beams imaged on the diffuser with a map of the irregularly spaced apertures of the mask to identify the measured sub-beams.

In some examples, measuring the wavefront includes measuring a tilt of the incident light. In some examples, the tilt is an average tilt.

In some examples, measuring the wavefront includes measuring a wavefront error of the incident light.

It is to be understood that any respective features/examples of each of the aspects of the disclosure as described herein may be implemented together in any appropriate combination, and that any features/examples from any one or more of these aspects may be implemented together with any of the features of the other aspect(s) as described herein in any appropriate combination to achieve the benefits as described herein.

BRIEF DESCRIPTION OF DRAWINGS

FIGS. 7A and 7B schematically illustrate an example configuration of the present wavefront sensor and its use to measure a tilted wavefront.

FIGS. 16A-16C illustrate wavefronts measured using the present wavefront sensor and using an interferometer for comparative purposes.

It is to be understood that any respective features/examples of each of the aspects of the disclosure as described herein may be implemented together in any appropriate combination, and that any features/examples from any one or more of these aspects may be implemented together with any of the features of the other aspect(s) as described herein in any appropriate combination to achieve the benefits as described herein.

DETAILED DESCRIPTION

Wavefront sensors with irregular aperture masks, diffusers, and cameras, and methods of making and using the same, are provided herein.

Figures 1A, 1B:
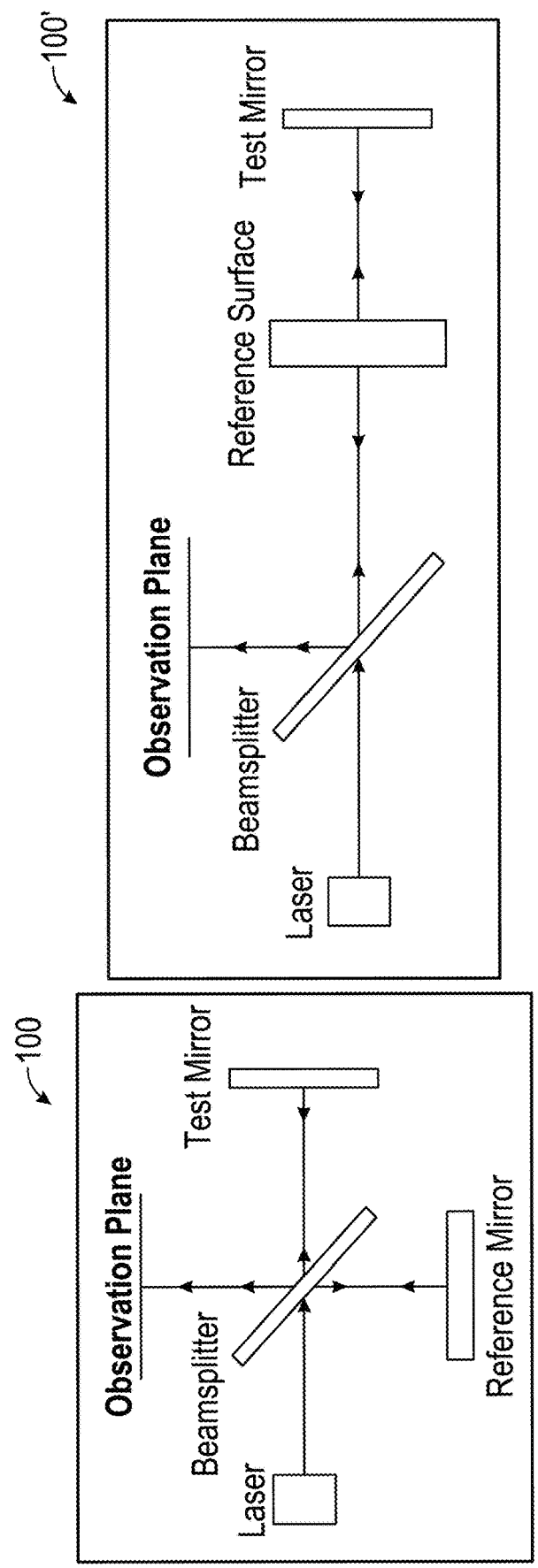
FIGS. 1A and 1B schematically illustrate example interferometer layouts.
Figure 2A:
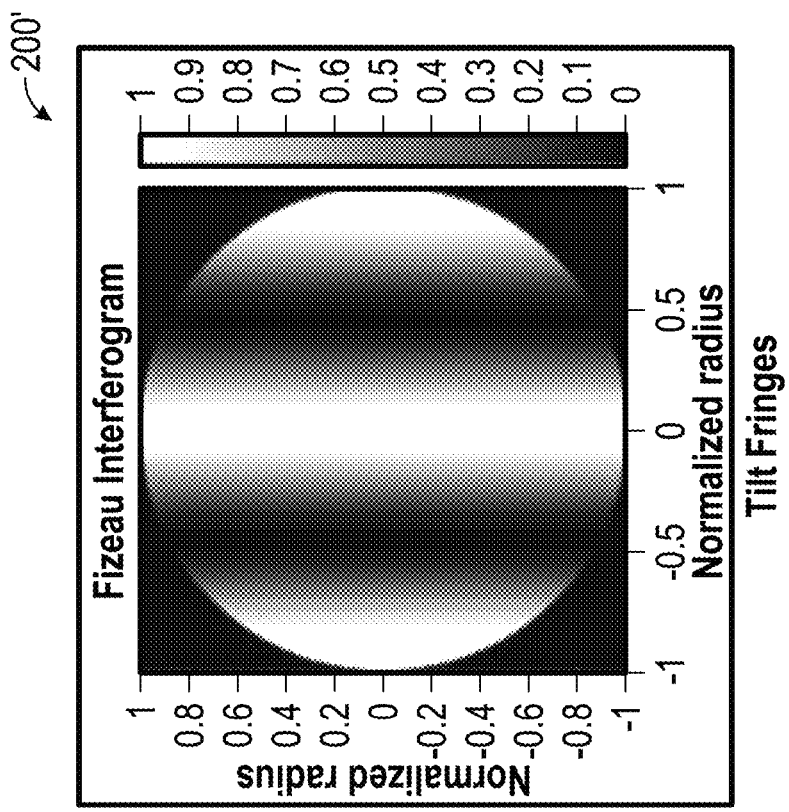
FIGS. 2A and 2B illustrate example interference patterns that may be obtained using interferometers such as illustrated in FIGS. 1A and 1B.
Figure 2B:
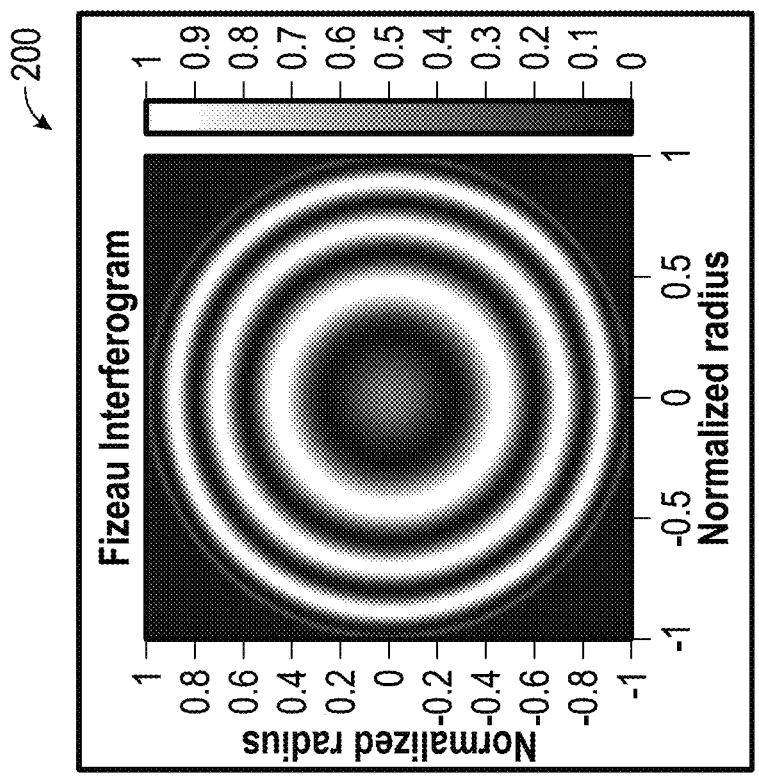
Figure 3A:
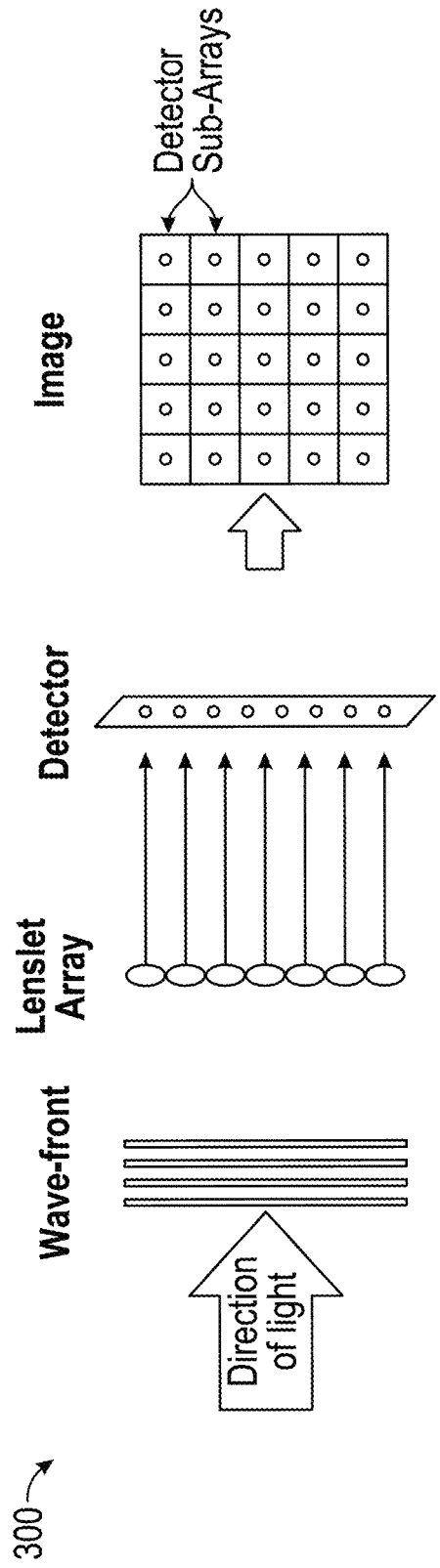
FIGS. 3A-3B schematically illustrate use of a Shack-Hartmann sensor to detect planar and aberrated wavefronts, respectively.
Figure 3B:
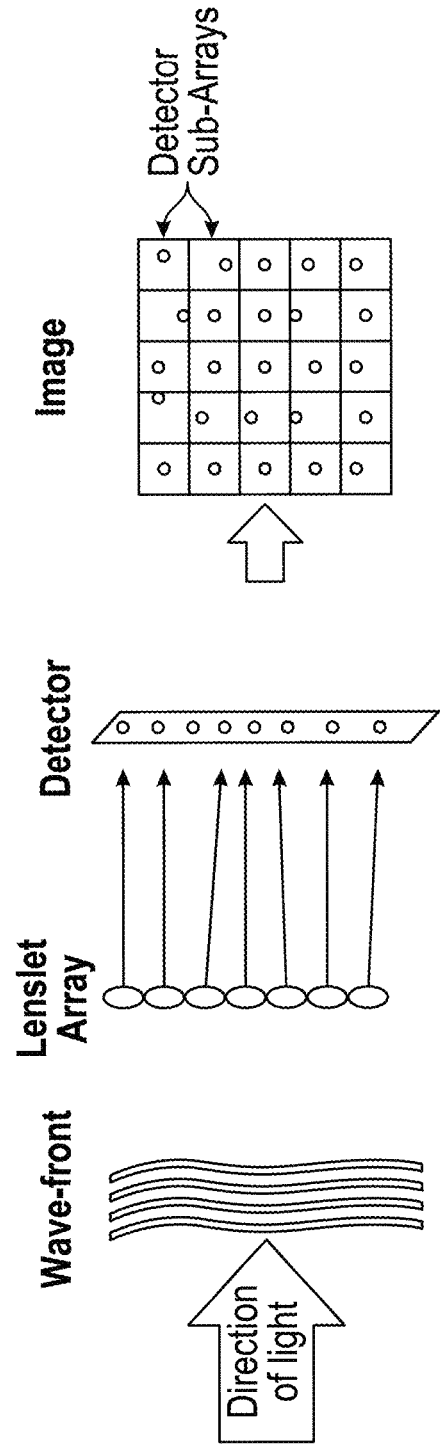
Figure 4:
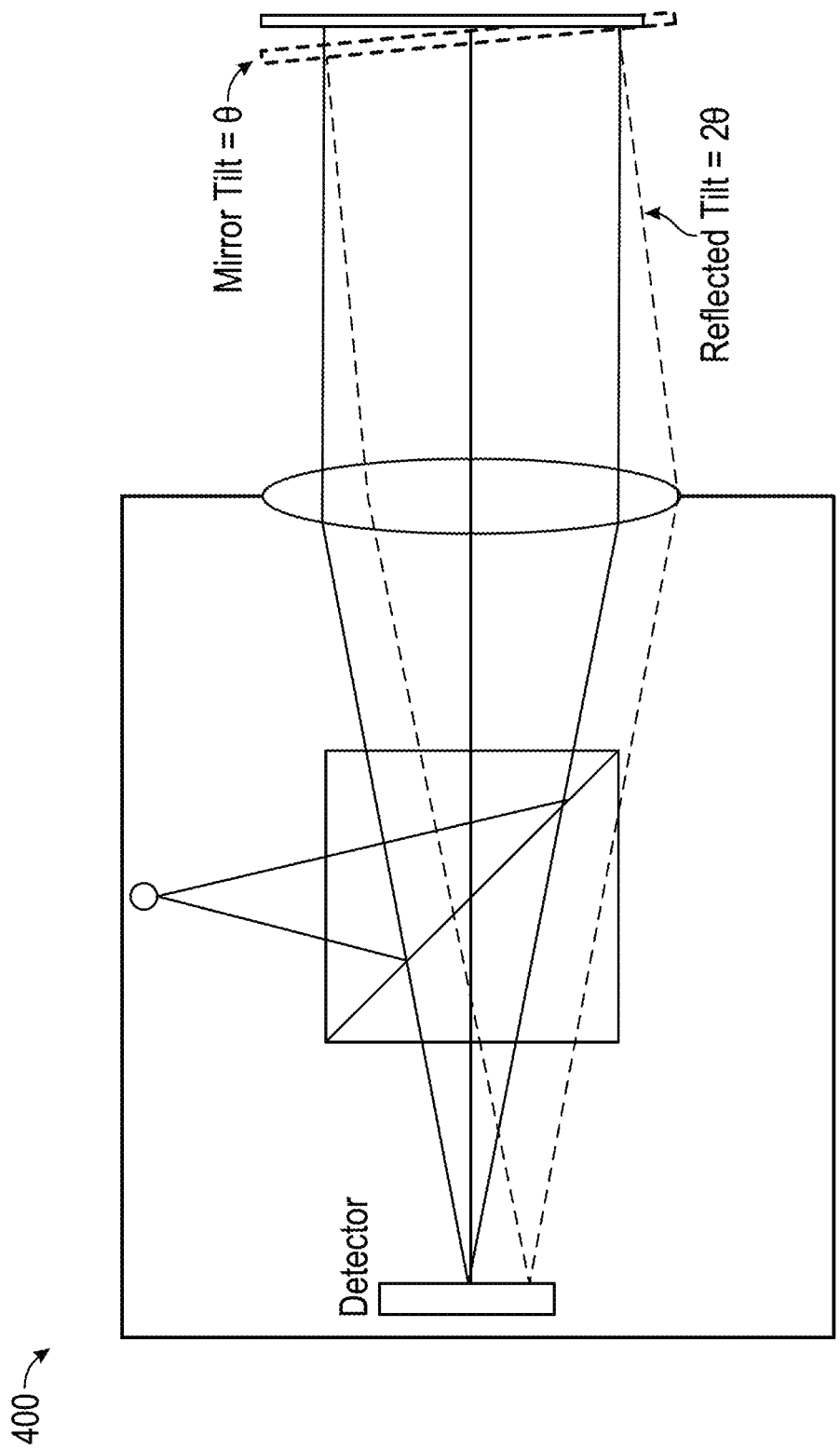
FIG. 4 schematically illustrates an example autocollimator.
Figure 5B:
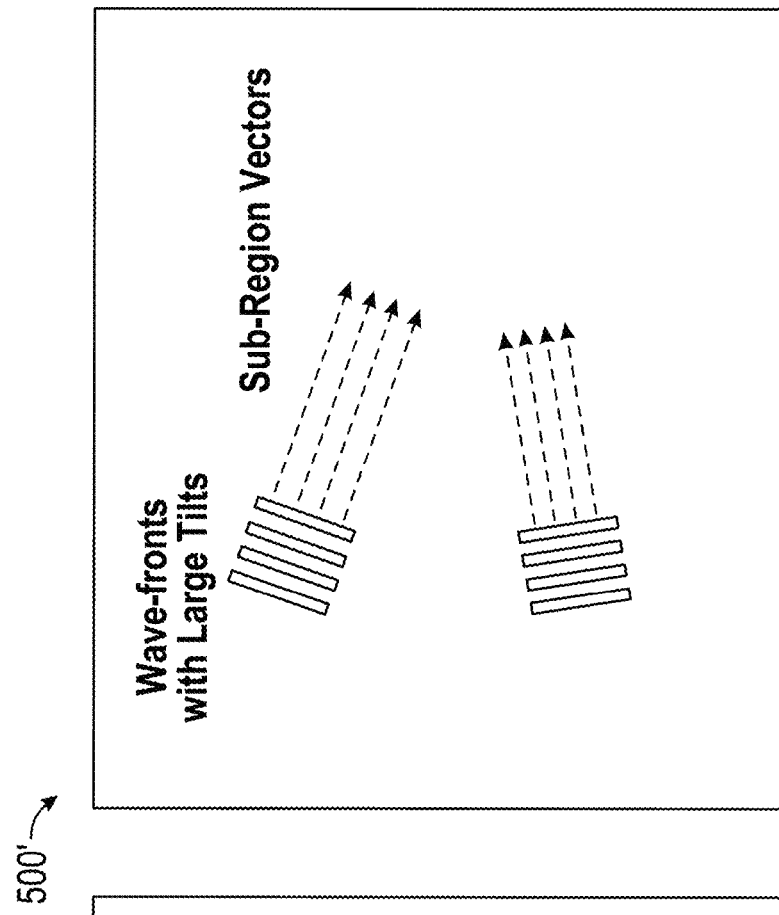
FIGS. 5A and 5B respectively schematically illustrate subregions of a wavefront with aberrations and wavefronts with large tilts.
Figure 5A:
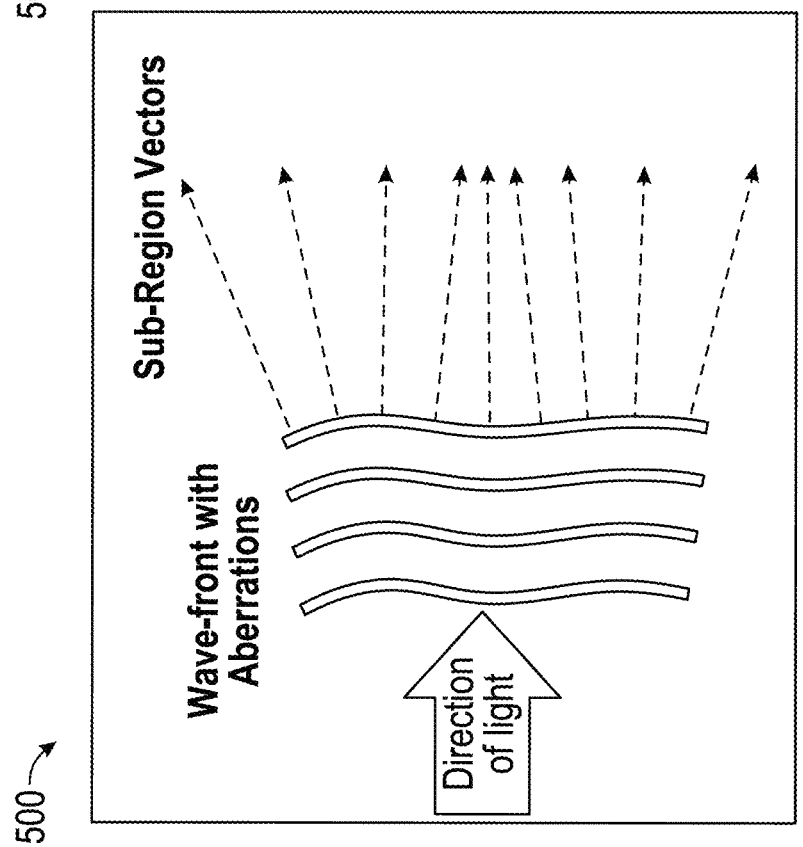

As provided herein, the present wavefront sensor may have significantly higher dynamic range than previously known wavefront sensors described with reference to FIGS. 1A-1B, 2A-2B, 3A-3B, and 4. More specifically, the present wavefront sensors measure the wavefront of incident light by separating the light into discrete, measurable sub-regions. Measuring the direction of propagation of the respective sub-regions then provides an array of wavefront surface normal vectors, or instantaneous subsampled gradients of the wavefront. From this information, the overall beam shape can be calculated. For example, FIGS. 5A and 5B respectively schematically illustrate subregions of a wavefront with aberrations and wavefronts with large tilts. The sub-regions of a highly aberrated beam (FIG. 5A) may inherently have a large range of directional vectors. As recognized by the present inventors, the ability to accurately measure a relatively large range of sub-region vectors (e.g., several degrees of angle range, illustratively on the order of about ten degrees, e.g., about ±5-10 degrees) can be one key to measuring relatively large wavefront errors (such as shown in FIG. 5A) e.g., errors on the order of tens to thousands of waves, e.g., on the order of tens to hundreds of waves, or on the order of hundreds to thousands of waves; and/or and wavefronts with relatively large tilts (such as shown in FIG. 5B), e.g., tilts on the order of several degrees, illustratively on the order of about ten degrees, e.g., about ±5-10 degrees.

The present sensor may be configured to measure relatively large wavefront errors that are too large for a typical interferometer to measure, for example because interference fringes may be too dense. The present sensor also or alternatively may be configured to measure relatively large tilts that are too large for a typical Shack-Hartmann or autocollimator to measure, for example because the tilt may move the light outside of the measurement area. As such, the present sensor may be considered to have a high dynamic range. As used herein, "dynamic range" is intended to refer to the ratio between resolution and range. Dynamic range refers to the ability to measure thousands or waves of error with the same accuracy as measuring one wave of error. A "high dynamic range" thus means a high resolution across a large range. In some examples, a high dynamic range means sub-wave wavefront resolution and <10 arcsecond angular resolution, with a measurement range of several millimeters and several degrees. Qualitatively, a high dynamic range wavefront sensor has a greater measurement range than an interferometer, and a greater angular measurement range than an autocollimator. In comparison, the previously known wavefront sensors described with reference to FIGS. 1A-1B, 2A-2B, 3A-3B, and 4 may have a significantly lower dynamic range, e.g., less ability to measure large wavefront errors or lower wavefront errors.

Figure 6:
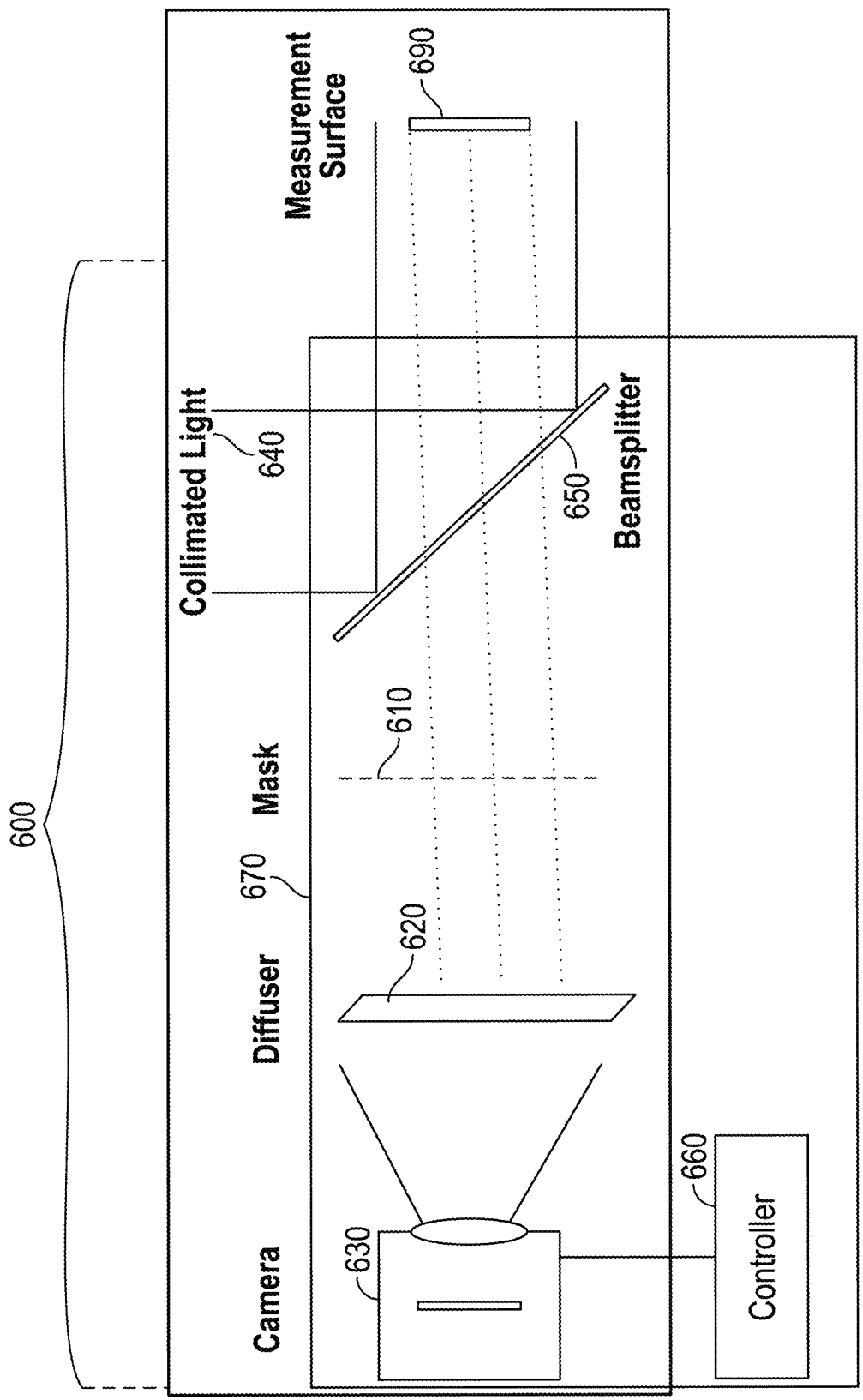
FIG. 6 schematically illustrates components of an example configuration of the present wavefront sensor.

Example components of the present wavefront sensor may include an irregular aperture mask, a diffuser, and a camera. For example, FIG. 6 schematically illustrates components of an example configuration of the present wavefront sensor. More specifically, sensor 600 illustrated in FIG. 6 includes aperture mask 610, diffuser 620, and camera 630. Aperture mask 610 may be configured to receive incident light having a wavefront to be measured. For example, sensor 600 optionally may include source 640 of collimated light (such as a laser, optionally including collimation optics, not specifically illustrated) and beamsplitter 650. Source 640 may be configured to generate collimated light having any suitable wavelength that is visible to camera 630 (illustratively, 415-532 nm). Source 640 may be, but need not necessarily be, a coherent source or include a tight wavelength band. In various examples, source 640 may include a fiber-coupled LED, continuous-wave (CW) laser, or pulsed laser.

Beamsplitter 650 may reflect light from source 640 to a surface the wavefront from which is to be measured, e.g., measurement surface 690. Beamsplitter 650 may receive light that is reflected (e.g., specularly) by measurement surface 690 and may transmit such light which then is incident on mask 610. In some examples, beamsplitter 650 may include a cube beamsplitter or a plate beamsplitter. Beamsplitter 650 may be configured to transmit and reflect the reflect light in any suitable ratio, illustratively to transmit about half of the received light and to reflect about half of the received light (a 50/50 beamsplitter). In other examples, source 640 and/or beamsplitter 650 may be omitted, and mask 610 may receive light that is transmitted by an optical component generating a wavefront to be measured.

Mask 610 includes irregularly spaced apertures that respectively transmit sub-beams of the incident light onto diffuser 620. Diffuser 620 is configured to receive the sub-beams transmitted by the irregularly spaced apertures of mask 610. In some examples, there is sufficient space between the mask and diffuser to allow for the projected light to move on the diffuser. However, if the spacing is too large, then diffraction effects may cause the projected spots to blur and potentially overlap. In some examples, the spacing between mask 610 and diffuser 620 may be between 40-75 mm.

Diffuser 620 may be located in the focal plane of camera 630. So as to enhance resolution, in some examples the diffuser also may be positioned so as to fill as much of the camera's FOV as possible, while still being in sufficiently good focus. Camera 630 may be configured to obtain a digital image of diffuser 620, and thus to obtain a digital image of the incident light the sub-beams of which irregular aperture mask 610 transmits onto diffuser 620. Camera 630 may be operably coupled to controller 660. Controller 660 may be configured to electronically receive the digital image of diffuser 620 from camera 630. Controller 660 may be configured to measure the wavefront of the incident light based on the digital image, e.g., to measure the tilt and/or wavefront error of the incident light, in a manner such as will be described in greater detail below with reference to FIGS. 7A-7B, 8A-8B, 9A-9B, 10A-10B, 11, 12, 13, 14, 15A-15B, and/or 16A-16C. As used herein, to "measure" a wavefront may encompass capturing an image of sub-beams of a wavefront, analyzing the image, and calculating the wavefront based on the analysis. In some examples, camera 630 is connected to controller 660 via USB, ethernet, or similar. Some setups may include a network switch or USB hub to allow for controller 660 to communicate with multiple cameras. Controller 660 may be configured to capture digital images from camera 630 and pass the image to a post-processing sequence performed by controller 660. The post-processing sequence may analyze the image to find the sub-beams (spots) projected on diffuser 620, determine the sub-beam vectors associated with each spot, and calculate the wavefront surface. In some examples, post-processing may be performed in Matlab or python.

Aperture mask 610 may include an array of apertures (which also may be referred to as pinholes) that segment incident light into sub-beams. Aperture mask 610 may be referred to herein as "irregular" because it includes irregularly spaced apertures. That is, the mask's aperture array may have a unique, non-repeating pattern such that a sub-region of a certain size is unique across the array. Spots of light transmitted by the mask can then be identified by the pattern of surrounding spots, instead of by the spot's projected position on the diffuser. In some examples, aperture mask 610 may be or include a printed pattern on a substrate, such as a chrome aperture array on a fused silica substrate using a photolithography process, or a thin metal with laser-cut pattern. The mask design may be tailored for unique applications, such as aperture diameter, spacing, and overall dimensions.

Diameter, spacing, and dimensions may be generally chosen based on the dimensions of the incident light being measured, the expected aberrations in the wavefront, as well as how much the light is expected to tilt and/or decenter. The mask should be large enough to accommodate the expected potential position of the incident light. For example, if the incident light is a 10 mm diameter beam and can move around +/−20 mm on the mask plane, then the mask should be at least 50×50 mm. The aperture's diameter and spacing may be sized to maximize the number of projected spots, without causing the spots to overlap. If the spots are too small and/or close together, they may start to blur due to diffraction effects. Illustratively, apertures may be about 100-500 microns in diameter. The smaller and closer the apertures are, the more may be added to the mask. Apertures may be circular, although other shapes may be used such as oval, square, rectangular, or the like. In one nonlimiting example, apertures are ~250 μm in diameter with a center-to-center spacing of ~500 μm. These parameters result in sufficiently sharp spots on the diffuser, e.g., for a diffuser which is a maximum of 75 mm from the mask and the incident light. The apertures center-to-center distance may need to be increased if the expected wavefront could cause the projected spots to overlap. Overlapping is possible when the projected light through neighboring apertures is converging. For example, if the incident light is a converging beam (if a concave mirror is being measured), the projected spots will be closer together than if the incident light was collimated, and therefore closer to overlapping.

Diffuser 620 diffuses the incident light from mask 610 such that discrete spots appear on the diffuser and can be imaged by camera 630. The diffuser's dimensions and position along the optical axis can be optimized for each application. The greater the distance between the mask and the diffuser, the more the spots will displace per unit angle. Examples of a diffuser may include a ground glass substrate, a thin film volumetric diffuser, or a holographic diffuser. In some examples, the diffuser should be large enough to accommodate the expected beam dimensions, position, and aberrations. The incident light is projected onto the diffuser in order for the camera to see the spots. The diffuser's distance from the mask may be increased so as to increase resolution. A greater the distance between the mask and diffuser will cause the projected spots to move a greater distance from their null position. However, diffraction effects may blur the spots if the diffuser is too far.

Camera 630 images the light that is projected onto diffuser 620. Note that without use of diffuser 620, camera 630 would need to be able to directly image the projected light. Although the light could simply be projected directly onto an imaging sensor, this would require that the sensor is large enough for the projected light to always land on it. Such a sensor may be prohibitively expensive. Alternatively, the projected light may be directly imaged with a lens and sensor. But this may require that the lens's pupil is large enough to accept the entire incident beam, which also may be challenging and prohibitively expensive. Imaging the diffuser adds flexibility and may be less expensive than the above-mentioned alternatives. The camera simply needs to be able to image the diffuser, and the diffuser preferably is large enough to accommodate the incident light.

The camera's sensor size, lens focal length, and working distance can be optimized depending on the system parameters. For example, the camera may be chosen with the goal of having sufficient resolution to resolve the sub-beams imaged onto the diffuser. To provide sufficient resolution, the sensor should have as many pixels as needed to provide such resolution, and the diffuser preferably fills as much of the camera's field of view as practicable.

Optionally, multiple cameras may be used to image diffuser 630 for increased resolution and/or larger diffusers. For example, the cameras may be extrinsically calibrated relative to each other to determine how to stitch their images together in post-processing. Alternatively, the cameras may have overlapping fields of view such that they will see some of the same projected spots. Then the reconstructed wavefront from each camera can be combined by aligning the shared datapoints (spots). The camera(s) may have intrinsic and extrinsic parameters that are calibrated to best post-process the image. Techniques for calibrating camera parameters are known in the art.

Sensor 600 optionally may include any suitable number and type(s) of beam shaping optics. For example, sensor 600 may include a collimated light source 640, fold mirrors, and/or beam splitter(s) 650 to reflect light off of a measurement surface before entering the wavefront sensor 600. Alternatively, the wavefront sensor 600 may receive light directly from an external system. Optional fold mirrors may be located somewhere between the collimated source and the beam splitter, for example to steer the beam for packaging reasons.

Sensor 600 optionally may include housing 670 in which aperture mask 610, diffuser 620, and camera 630 are located. Controller 660 optionally may be located within the housing 670 and coupled to camera 630 via a direct electrical connection (e.g., cabling), or alternatively may be located remotely from the housing and coupled to camera 630 via a wireless connection (e.g., WiFi, Bluetooth, or the like).

FIGS. 7A and 7B schematically illustrate an example configuration 700 of the present wavefront sensor and its use to measure a tilted wavefront. In this example, the incident wavefront 710 (whether reflected from a measurement optic or received directly) is split into sub-beams at the mask 610, which then project onto the diffuser 620. Camera 630 generates image 720 of the diffuser. The position of the spots on the diffuser 620 is a function of the direction of propagation of the wavefront as it enters each aperture. As the wavefront tilts (FIG. 7B), the spots will move relative to the reference position (FIG. 7A) according to the tilt angle. In a manner such as described below, wavefront characteristics can be calculated by controller 660 based on the position 722 of each projected spot (sub-beam of the incident wavefront) on the diffuser relative to both its reference position (721, FIG. 7A corresponding to straight wavefront) and its neighboring spots. Note that although for simplicity of illustration FIGS. 7A-7B may appear to suggest that the spots (sub-beams) are regularly and periodically spaced, the apertures of mask 620 may be irregularly spaced and therefore the spots similarly may be irregularly spaced.

Figure 8A:
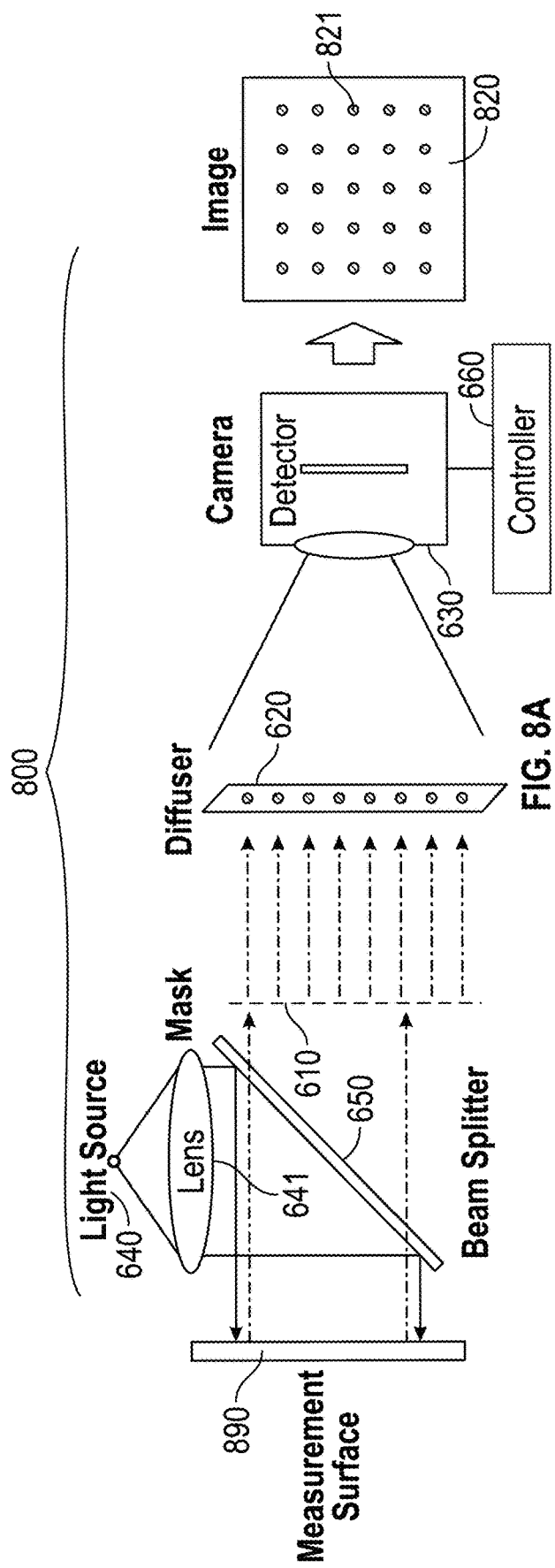
FIGS. 8A and 8B schematically illustrate an example configuration of the present wavefront sensor and its use to measure an aberrated wavefront.
Figure 8B:
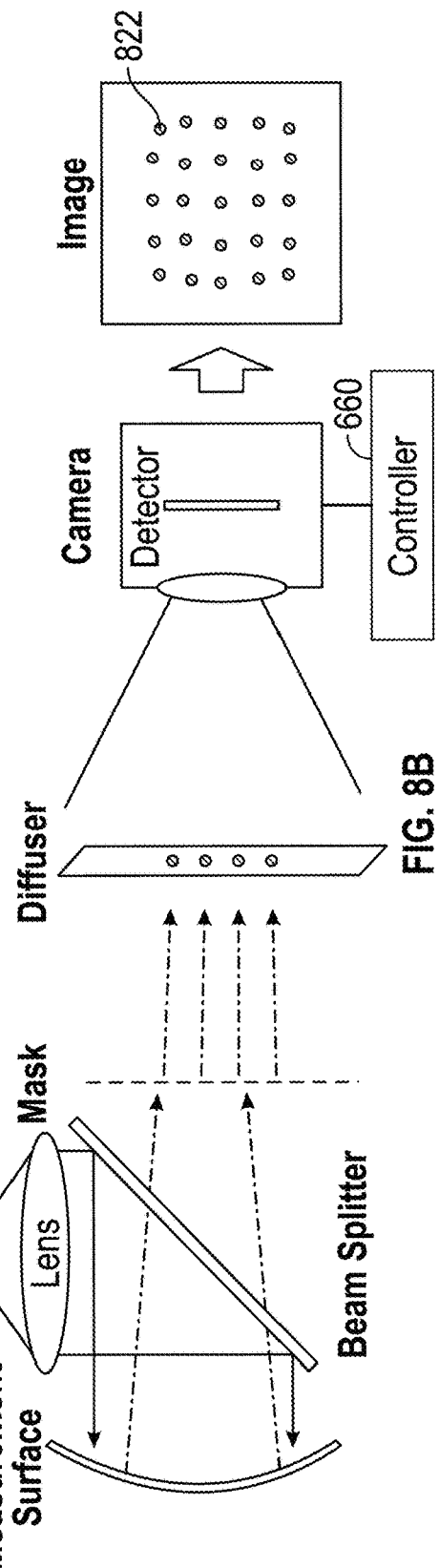

FIGS. 8A and 8B schematically illustrate an example configuration 800 of the present wavefront sensor and its use to measure an aberrated wavefront. In the example illustrated in FIG. 8A, the surface of an optic (measurement surface 890) is measured by reflecting a reference beam off the optic. For example, a beam from light source 640 is collimated using lens 641 and reflected to measurement surface 890 using beamsplitter 650, and then then beamsplitter 650 transmits the reflected light from measurement surface 890 to mask 610. Mask 610 samples the incident light and projects spots onto diffuser 620 that is imaged by camera 630. As long as the projected sub-regions land on the diffuser 620 with sufficient contrast, they can be re-imaged by the camera 630 and wavefront can be determined. For example, measurement surface 890 illustrated in FIG. 8A is substantially flat, such that the respective locations of spots 821 of image 820 provide a reference position. In comparison, measurement surface 891 illustrated in FIG. 8B is aberrated, and so the wavefront of the light reflected from such surface is aberrated. The spots will move relative to the reference position (FIG. 8A) according to the aberration. In a manner such as described below, wavefront characteristics can be calculated by controller 660 based on the position 822 of each projected spot (sub-beam of the incident wavefront) on the diffuser relative to both its reference position (821, FIG. 8A corresponding to straight wavefront) and its neighboring spots. Note that although for simplicity of illustration FIGS. 8A-8B may appear to suggest that the spots (sub-beams) are regularly and periodically spaced, the apertures of mask 620 may be irregularly spaced and therefore the spots similarly may be irregularly spaced.

In some examples, a unique, non-repeating (aperiodic) pattern in mask 620 may allow for each spot to be identified, given that a required minimum number of spots appears on the diffuser, e.g., a sufficient number of spots to identify the pattern. After identification, each spots' displacement from its null position (reference position, e.g., corresponding to a straight wavefront such as shown in FIGS. 7A and 8A) can be calculated by controller 660. Using this method, projected spots may not be required to stay within a certain area on the diffuser, and therefore may have a high dynamic range. In other words, as long as the spots appear on the diffuser 620 with sufficient contrast (e.g., sufficient intensity to be imaged) and order (e.g., substantially do not overlap), their propagation vector can be calculated by controller 660.

Calibration

A multi-step calibration may be performed to characterize the intrinsic parameters of the imaging camera, the null spot positions, the diffuser position relative to the mask (focal length), and/or the sensor assembly's position and configuration. This calibration results in a traceable and absolute measurement accuracy of an optical wavefront across a relatively large field of view.

For example, a collimated reference beam (e.g., an on-axis relatively low wavefront error reference beam) may be measured by sensor 600 and used by controller 660 to calibrate the spots' respective null positions (reference positions) on diffuser 620. The camera 630 will image the spots created from this reference beam, and controller 660 uses such image to identify the respective spots, and save their respective null positions. In later measurements, controller 660 will then find the spot locations in the image of diffuser 620, compare the spot locations to their corresponding null positions to determine a position delta from null, and use the position delta to calculate the instantaneous wavefront gradient.

The present wavefront sensor's focal length f, corresponding to the mask 610 to diffuser 620 distance, may be calibrated to calculate the angle of incident light from the spot's position delta from null. This is achieved by adjusting the angle of incidence of a low wavefront error beam by a known amount and recording the corresponding position deltas associated with each change in angle theta. Given these position deltas and corresponding angles, the focal length f be calculated by controller 660 using f=position_delta/tan(theta). This can be used by controller 660 to calculate an average focal length for all spots, or to calculate a focal length for each spot individually. In a manner such as described in greater detail below, the average focal length may be used to calculate the angle of incidence of the projected spots from their positions on the diffuser. Calculating the focal length for each spot individually may be performed, for example, if the focal lengths of the apertures are inconsistent across the mask. This can be the case, for example, if the mask and diffuser are not parallel, or if one or both of such elements are not flat. In these cases, the respective distance from each aperture to the corresponding region of the diffuser may vary.

During such measurements, the reference beam can reflect off an adjustable fold mirror to change the angle of incidence. A motorized rotation stage or goniometer may be used to apply known angles to the fold mirror. Alternatively, other measurement tools, such as an autocollimator or theodolite, may be used to measure the fold mirror's angle change.

High dynamic Wavefront Sensor Processing

Sub-Region Identification

Figure 9A:
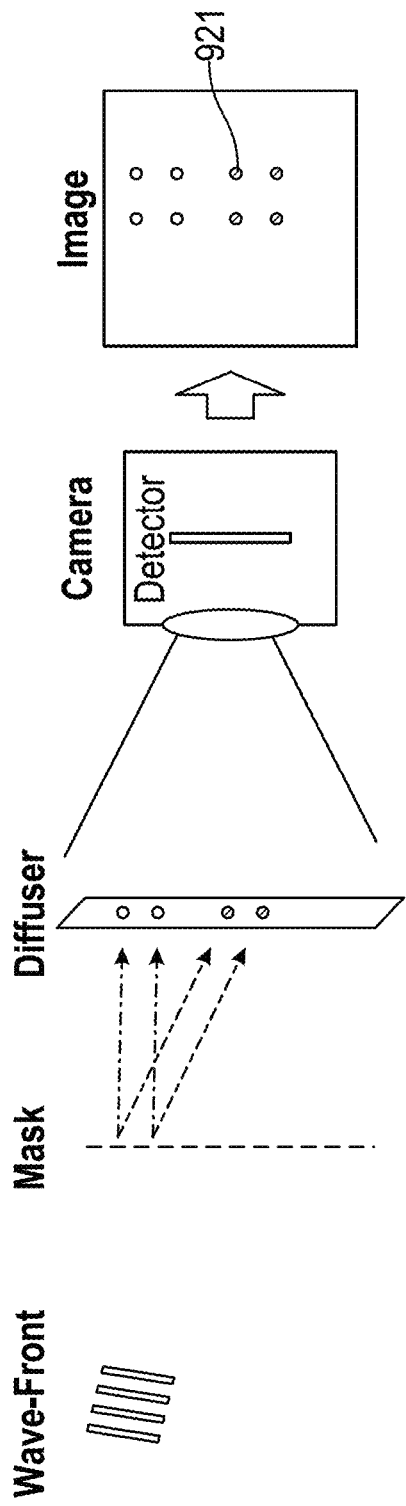
FIGS. 9A and 9B schematically illustrate an example configuration of the present wavefront sensor and its use to measure a tilted wavefront.
Figure 9B:
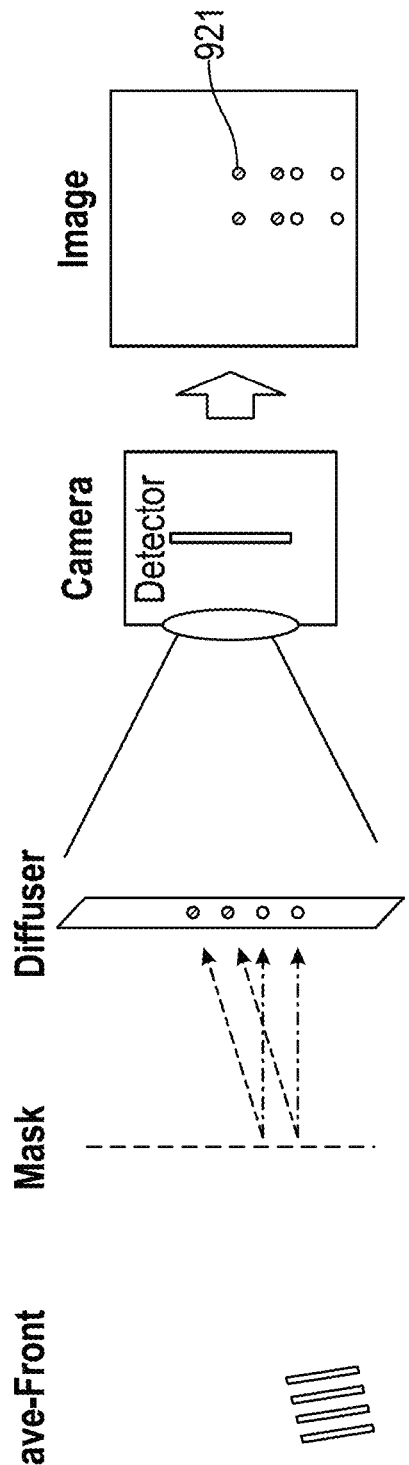

In some examples, when measuring a wavefront, the imaged spots must be uniquely identifiable by controller 660 such that the spots' corresponding null positions can be determined, and therefore their position deltas from null. Determining the corresponding null position for any visible spot, regardless of displacement magnitude, may be important for a high dynamic range. FIGS. 9A and 9B schematically illustrate an example configuration of the present wavefront sensor and its use to measure a tilted wavefront. As shown in FIGS. 9A-9B, if the projected spots are unidentifiable because the mask has a uniform pattern of apertures (instead of the non-repeating (aperiodic) pattern of the present mask), images with different wavefronts may appear identical, potentially causing wavefronts to be indiscernible. For example, if the mask has a uniform pattern, then incident light at different angles may result in the same image on the diffuser, and there would be no way to uniquely identify a given spot or its null position. Illustratively, FIGS. 9A and 9B result in the same image of filled spots 921, but the vectors that created those spots are different.

Figure 10B:
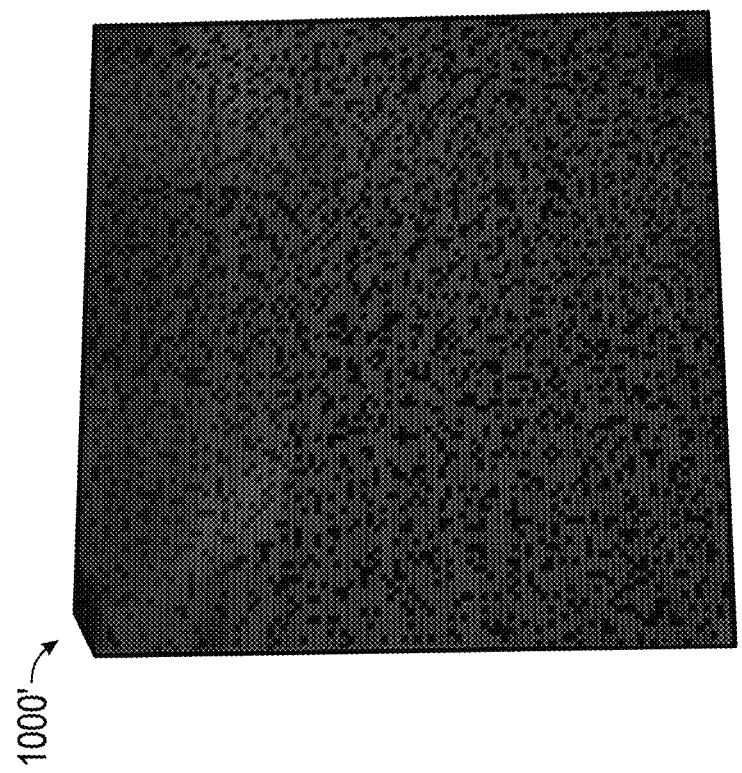
FIG. 10B is an image of an example aperture mask prepared using the layout illustrated in FIG. 10A.
Figure 10A:
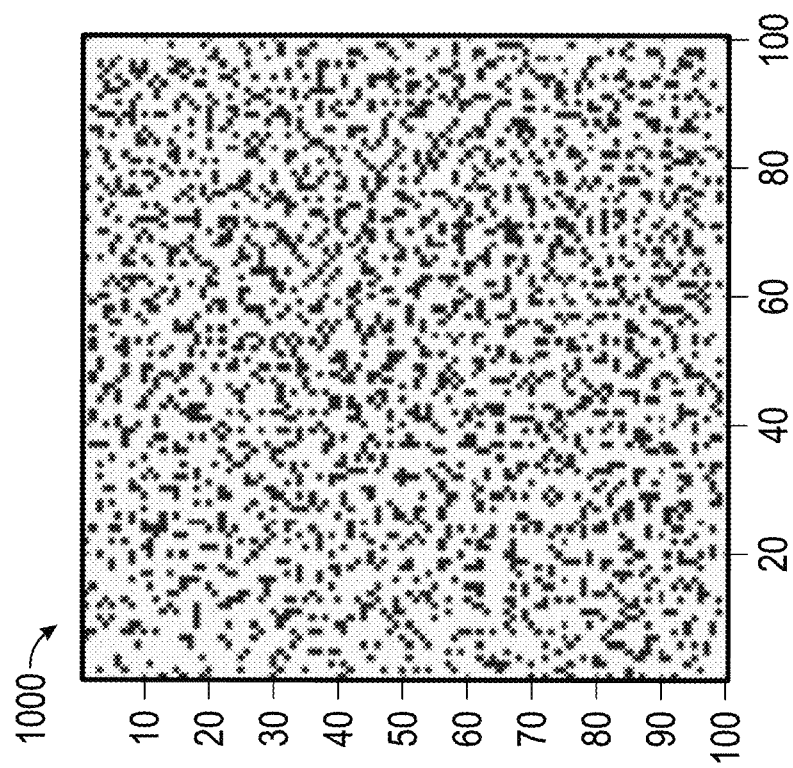
FIG. 10A schematically illustrates a computer-generated layout of an example aperture mask for use in the present wavefront sensor.

FIG. 10A schematically illustrates a computer-generated layout of an example aperture mask for use in the present wavefront sensor. More specifically, FIG. 10A shows an example mask pattern, including or consisting of a 100×100 grid of apertures with strategically placed voids, such that the binary code of each 5×5 sub-window is unique. Therefore, assuming that a minimum grid of 5×5 spots will be illuminated by the incident beam and imaged on the diffuser 620, regardless of their actual position on the diffuser, the spots will be identifiable. Real holes in the mask are considered "on" spots, while the absence of a hole is considered an "off" spot. FIG. 10B is an image of an example aperture mask prepared using the layout illustrated in FIG. 10A. More specifically, the layout in FIG. 10A was used to create the apertures in the 3D modeling software. The mask shown in FIG. 10B was fabricated by printing chrome on a fused silica substrate using a photolithography process implementing the layout which had been created in the 3D modeling software.

Figure 11:
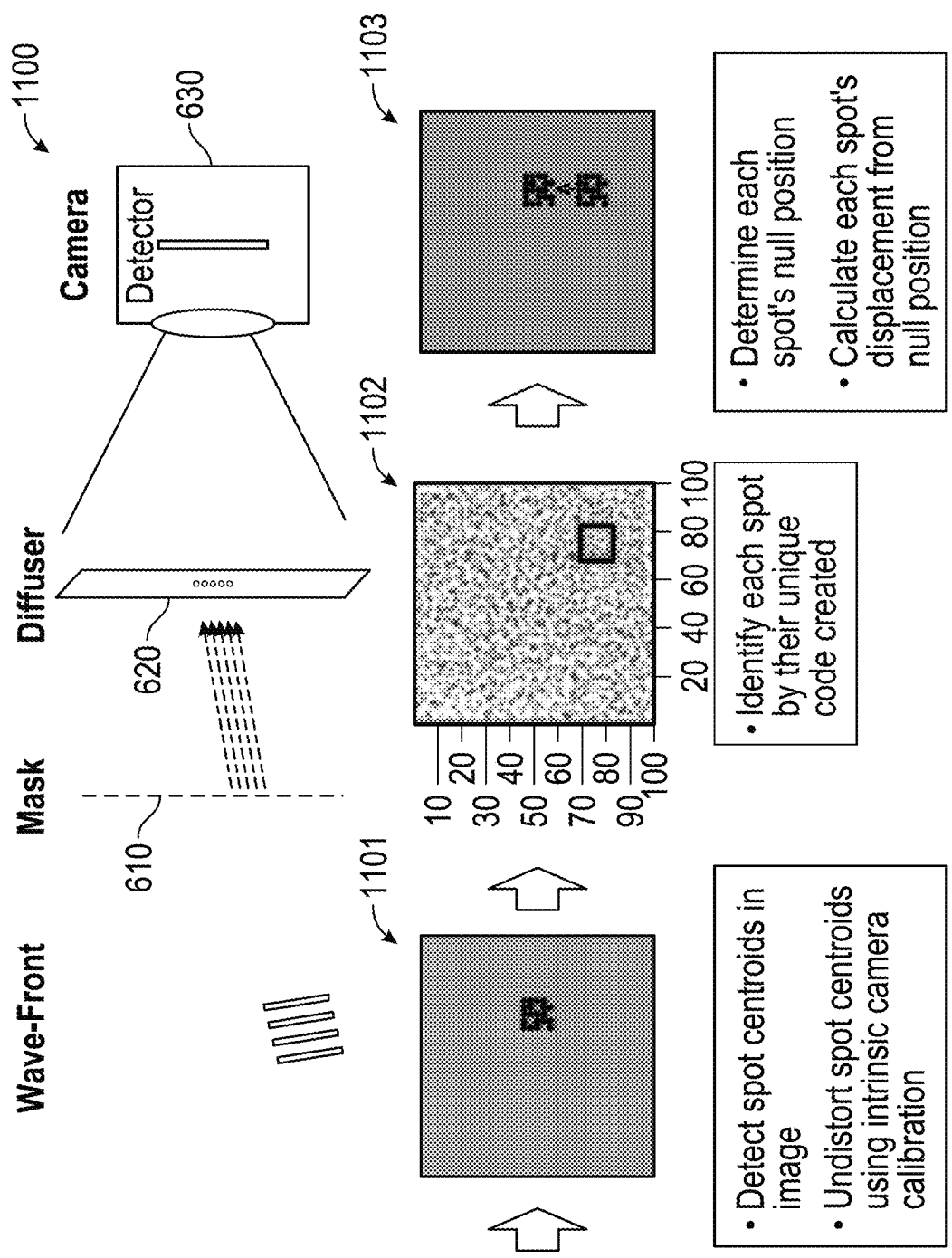
FIG. 11 illustrates an example flow of operations in a method for measuring a wavefront using the present wavefront sensor.

FIG. 11 illustrates an example flow of operations in a method for measuring a wavefront using the present wavefront sensor. More specifically, for an example of a 100×100 mask pattern with unique 5×5 sub-windows, the spot identification process 1100 is shown in FIG. 11. A wavefront (e.g., a tilted wavefront) is incident on mask 610, which projects spots onto diffuser 620. Camera 630 obtains an image of diffuser 620 and controller 660 (not specifically shown in FIG. 11) subsequently processes such image to identify the spots and calculate each spots' displacement from the null position. For example, at operation 1101 controller 660 detects spot centroids in the image, and undistorts the spot centroids using the intrinsic camera calibration. At operation 1102, controller 660 identifies each spot by their unique code created. For example, controller 660 may convolve the imaged spot pattern with the known full spot pattern to locate where the patterns align. The imaged spots are then assigned an index corresponding to the index of the matched spots in the full pattern. At this point, each spot has been identified; in other words, their position in the full pattern has been found. At operation 1103, controller 660 determines each spot's null position, and calculates each spot's displacement from the null position. For example, using the null calibration data and the assigned indices, controller 660 looks up each spot's null position. Each spot's displacement from null can be calculated by subtracting the imaged spot positions (in pixels or millimeters) from the corresponding null position.

The dimensions of the mask pattern and the dimensions of the minimum unique sub-window may be tuned depending on the appropriate field of view (e.g., based on the anticipated beam's wavefront, tilt, and decenter range, such as described above) and the anticipated beam diameter of incident light. The mask may include a plurality of sub-windows, each having a particular pattern of on and off spots does not exist in any other of the sub-windows. As such, the number represented by the binary code in each of the sub-windows is different. For example, if the mask pattern is 100×100 and the incident beam is expected to illuminate a minimum of 50×50 spots, then each 50×50 sub-window preferably is unique. To accomplish this, fewer "off" spots or voids in the pattern may be used, compared to 5×5 unique sub-windows. This is because many more binary codes are possible in a 50×50 grid than in a 5×5 grid, and fewer unique codes need be used because there are fewer 50×50 sub-windows than 5×5 sub-windows. Additionally, the patterns may be optimized to minimize or reduce the number of "off" spots, and therefore maximize or increase signal.

The mask pattern can be created using an algorithm that starts with an array of "on" spots, or "one" bits, randomly flips bits to "off" one at a time, and checks if the number of unique binary sub-window codes increases. If the number of unique codes (the number of unique numbers that can be calculated from the binary within each sub-window) increases, then the new "off" spot is kept, otherwise the change is discarded and the spot is returned to "on." For example, a 5×5 sub-window can be simplified into a 25-bit string, which can be converted from binary to a number.

This process continues until the number of unique sub-window codes is equivalent to the number of sub-windows in the entire mask, meaning each sub-window is unique. The result is a binary array that determines which apertures in the physical mask should be fabricated, and which should not be fabricated.

Image Processing and Wavefront Calculation

Figure 12:
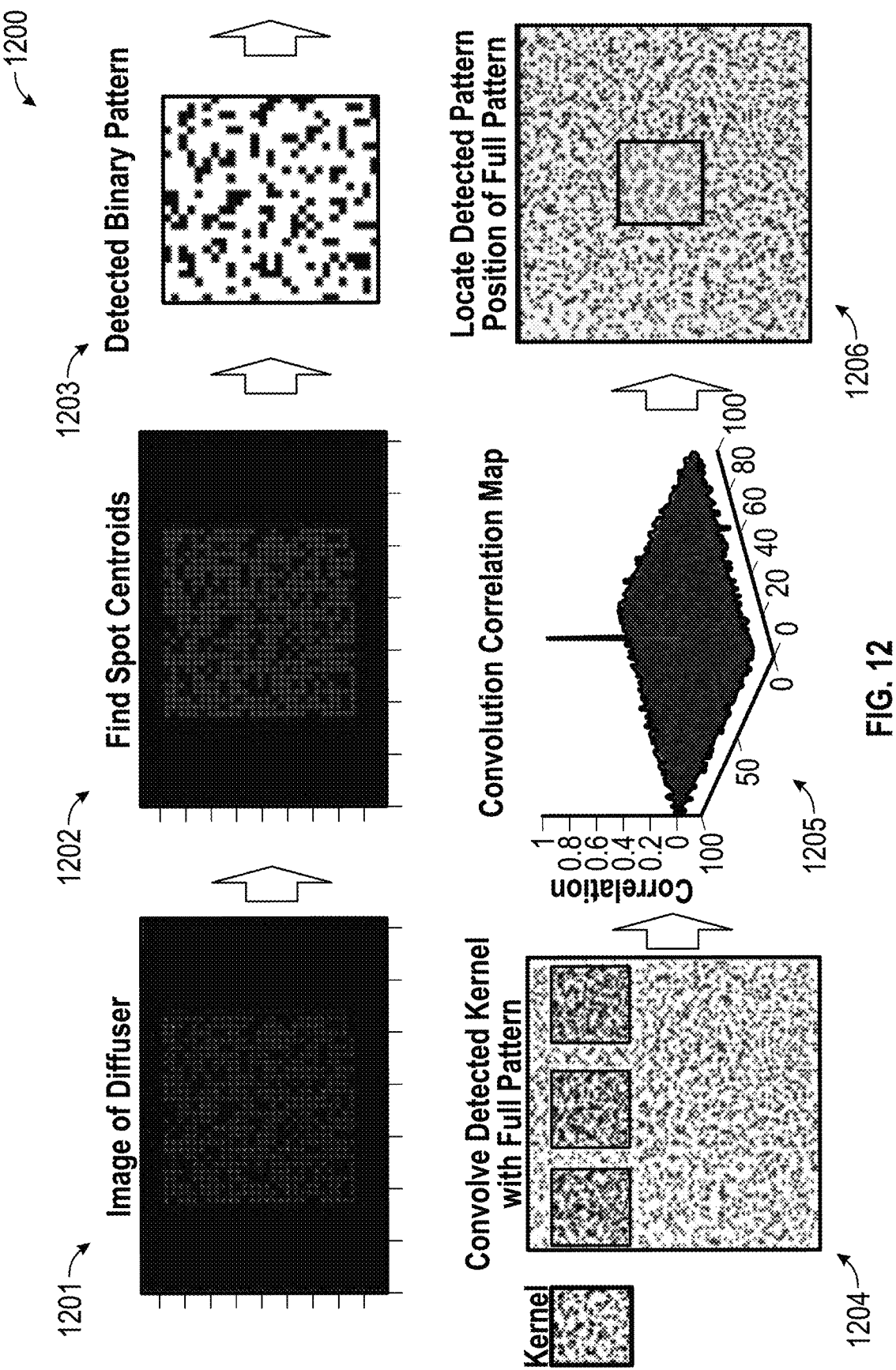
FIG. 12 illustrates an example flow of operations in a method for measuring a wavefront using the present wavefront sensor.

FIG. 12 illustrates an example flow of operations in a method for measuring a wavefront using the present wavefront sensor. More specifically, for a given pattern and image, the spot identification process 1200 is shown in FIG. 12. First, image processing is performed. At operation 1201, an image of diffuser 620 is obtained by controller 660. At operation 1202, controller 660 determines the centroid of all spots visible in the image. This may be done using a variety of centroiding and peak-finding algorithms. At operation 1202, the spot centroid positions also may be undistorted by controller 660 using the previously characterized intrinsic parameters of the camera 630.

Figure 13:
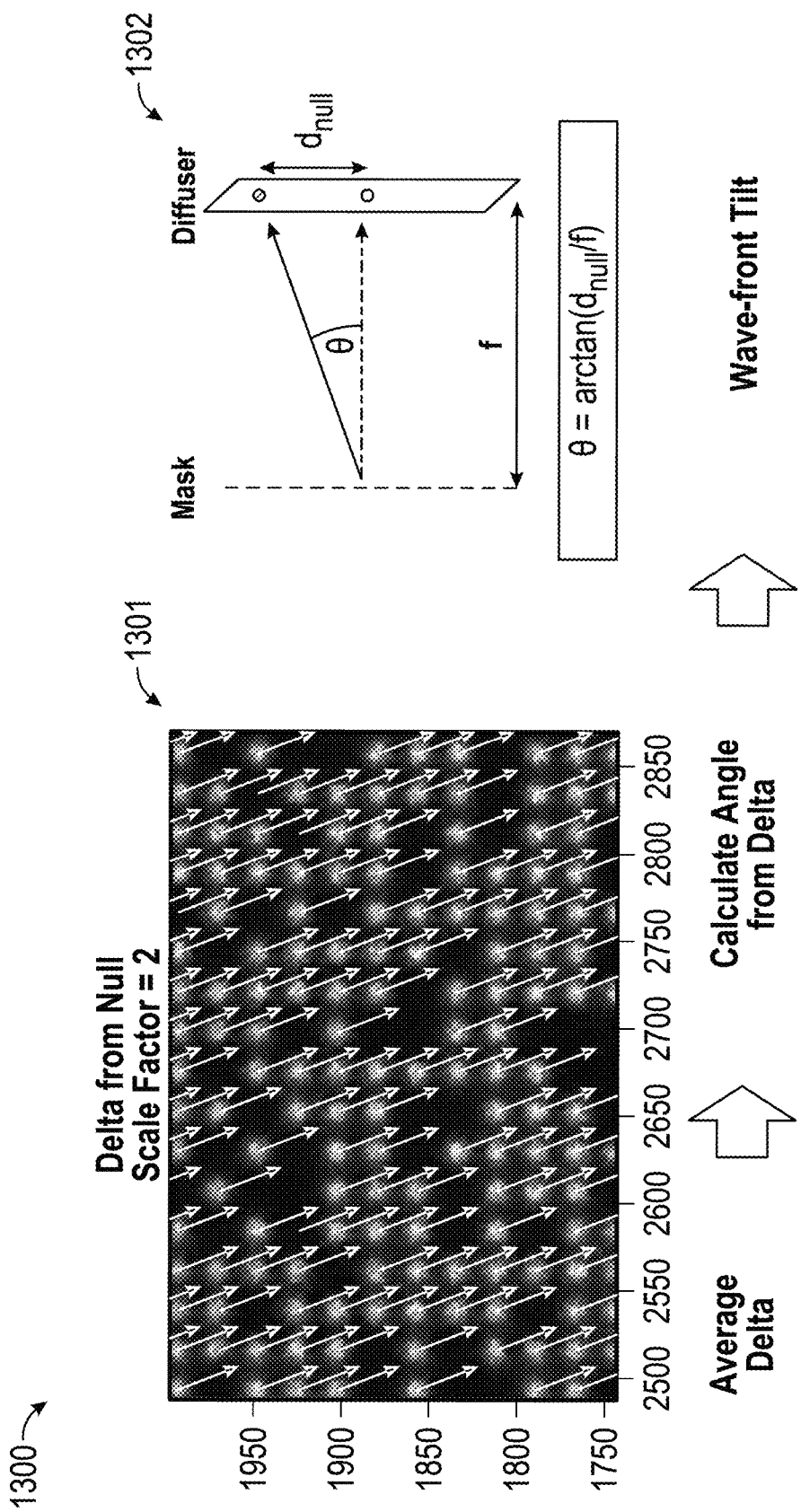
FIG. 13 illustrates an example flow of operations in a method for measuring a wavefront using the present wavefront sensor.

Next, pattern detection is performed. At operation 1203, using the undistorted centroid positions, controller 660 determines the detected n×m binary array pattern. At operation 1204, controller 660 convolves this detected binary array (sub-beams imaged on the diffuser) with the full binary array pattern (map of irregularly spaced apertures of the mask) to identify the measured spots (sub-beams) in the full pattern. For example, at operation 1204, controller 660 convolves the detected binary kernel with the known full spot pattern to locate where the patterns align. The correlation map's peak in operation 1205 is the location where the kernel best matches the full pattern. The detected spots are then assigned an index corresponding to the index of the matched spots in the full pattern. At this point, each spot has been identified; in other words, their position in the full pattern has been found (operation 1206). During operation 1206, controller 660 calculates the spot's position change relative to null. Controller 660 calculates the angle or gradient based on the spot's position change from null. Controller 660 calculates the average angle of the wavefront for bulk tilt measurements, or reconstructs the wavefront from gradient array. For example, wavefront sensor 660 may measure flat mirrors or collimated beams in order to determine bulk pointing angles, similar to an autocollimator. FIG. 13 illustrates an example flow of operations in a method for measuring a wavefront using the present wavefront sensor. In this scenario, the average spot displacement from null, $d_{null}$ (operation 1301) may be used by controller 660 to calculate the wavefront's tilt ($\theta$) given the sensor's previously calibrated focal length (f), using $\theta=\arctan(d_{null}/f)$ (operation 1302). Controller 660 may suitably output the wavefront's tilt ($\theta$), e.g., may generate a screen display of a graphical and/or numerical representation of the tilt, and/or may store a graphical and/or numerical representation of the tilt in a computer-readable medium. Illustratively, controller 660 may output a graphical representation of the wavefront surface in a GUI, e.g., as a snapshot in time or as a stream. Additionally, or alternatively, controller 660 may output a file (illustratively, a .CSV file) that numerically represents the mean angle of the incident light and/or the respective angles of sub-beams thereof.

Figure 14:
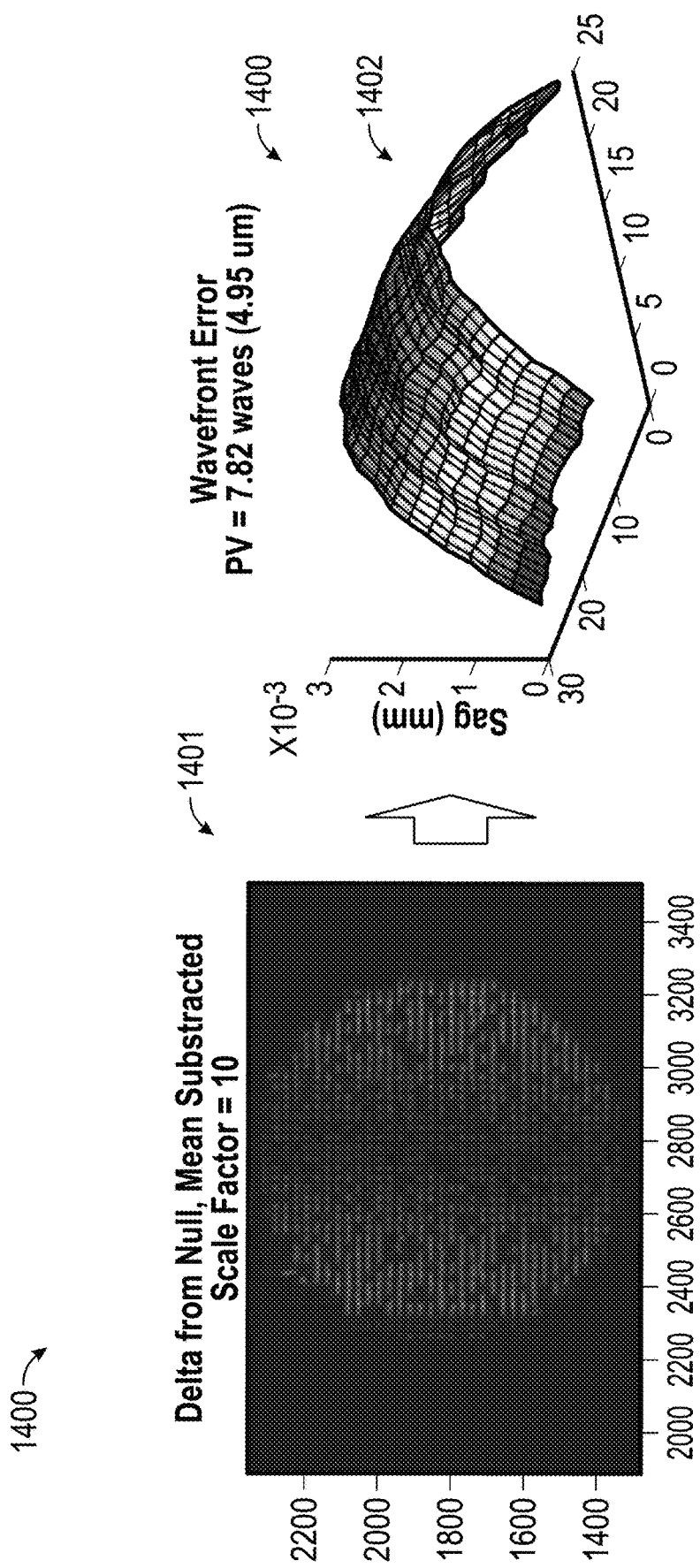
FIG. 14 illustrates an example flow of operations in a method for measuring a wavefront using the present wavefront sensor.

Alternatively, in the example of measuring an imperfect wavefront, the instantaneous wavefront slopes of each sub-region may be determined by controller 660 by calculating θ for each spot. FIG. 14 illustrates an example flow of operations in a method for measuring a wavefront using the present wavefront sensor. If the beam is not co-aligned with the sensor 600, the mean $d_{null}$ may be subtracted out by controller 660 (operation 1401) to visualize and calculate the residual wavefront with tilt removed. The resultant array of the wavefront gradient may be integrated by controller 660 to calculate the wavefront surface (operation 1402). Non-limiting algorithms for implementing such integrations are available in open source code for Matlab, and include piecewise integration, inverse gradient, and modal decomposition. FIG. 14 shows the calculated wavefront (output of operation 1402) for the given image (shown at operation 1401). Controller 660 may suitably output the wavefront's tilt (θ), e.g., may generate a screen display of a graphical and/or numerical representation of the wavefront error, and/or may store a graphical and/or numerical representation of the tilt in a computer-readable medium.

Figures 15A, 15B:
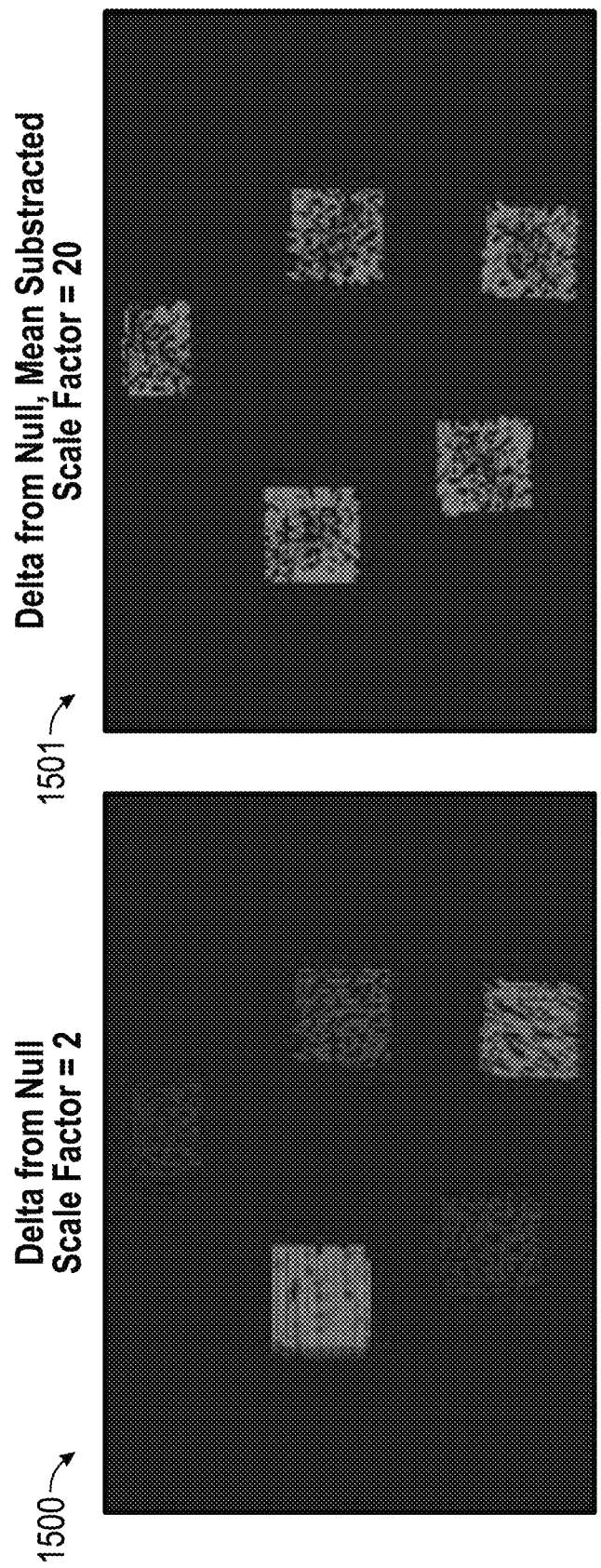
FIGS. 15A and 15B illustrate an example flow of operations in a method for measuring a wavefront using the present wavefront sensor.

Multiple wavefronts may be measured simultaneously with a single measurement in some embodiments. FIGS. 15A and 15B illustrate an example flow of operations in a method for measuring a wavefront using the present wavefront sensor. In the example shown in FIGS. 15A-15B, five wavefronts are measured by controller 660, each with various degrees of rigid body tilts. Each wavefront may be processed separately by controller 660, and the mean angle may be calculated for each respective wavefront to determine their pointing angles relative to each other, or their co-alignment. Again, each beam's mean tilt may be removed by controller 660, and each residual wavefront may be determined by controller 660. The vectors in FIG. 15A represent the spot's displacement from null, and shows that each of the 5 returns are tilted differently. The tilt of all 5 returns can be measured with a single image. In FIG. 15B, the mean displacement from null for each of the five returns is calculated. Then the return's mean displacement is subtracted from each spot's displacement within that return. The resulting vectors in 15B show the spots residual displacement from null after the mean tilt is subtracted from each return. The residual wavefront of all 5 returns can be measured with a single image.

In some embodiments, the measured wavefront can be fit with Zernike polynomials to deconstruct individual optical aberrations (astigmatism, coma, etc.) for the purposes of optical system alignment and optimization. Fitting Zernike polynomials is well known and there is open-source code to do it. Zernike polynomials can provide helpful feedback when aligning an optical system, based on the magnitude of each polynomial term. For example, if the majority of the wavefront error is fit with the "power" Zernike term, then it can be inferred that the system is not focused properly. Other Zernike terms may infer lens decenter or tilt, or internal stresses in the optic from mounting.

It should be appreciated that controller 660 may be implemented using any suitable combination of digital electronic circuitry, integrated circuitry, application specific integrated circuits (ASICs), field programmable gate arrays (FPGAs), central processing units (CPUs), graphical processing units (GPUs), computer hardware, firmware, software, and/or combinations thereof. For example, one or more functionalities of controller 660 may be implemented in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as modules, programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the terms "memory" and "computer-readable medium" refer to any computer program product, apparatus and/or device, such as magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers and/or the cloud, depending upon the situation at hand.

In one nonlimiting example, controller 660 described with reference to FIG. 6 may be implemented using a computing device architecture. In such architecture, a bus (not specifically illustrated) can serve as the information highway interconnecting the other illustrated components of the hardware. The system bus can also include at least one communication port (such as a network interface) to allow for communication with external devices either physically connected to the computing system or available externally through a wired or wireless network. Controller 660 may be implemented using a CPU (central processing unit) (e.g., one or more computer processors/data processors at a given computer or at multiple computers) that can perform calculations and logic operations required to execute a program. Controller 660 may include a non-transitory processor-readable storage medium, such as read only memory (ROM) and/or random access memory (RAM) in communication with the processor(s) and can include one or more programming instructions for the operations provided herein, e.g., for implementing methods 300 and/or 400. Optionally, the memory may include a magnetic disk, optical disk, recordable memory device, flash memory, or other physical storage medium. To provide for interaction with a user, controller 660 may include or may be implemented on a computing device having a display device (e.g., a CRT (cathode ray tube) or LCD (liquid crystal display) monitor) for displaying information obtained to the user and an input device such as keyboard and/or a pointing device (e.g., a mouse or a trackball) and/or a touchscreen by which the user can provide input to the computer.

Working Examples

Figure 17:
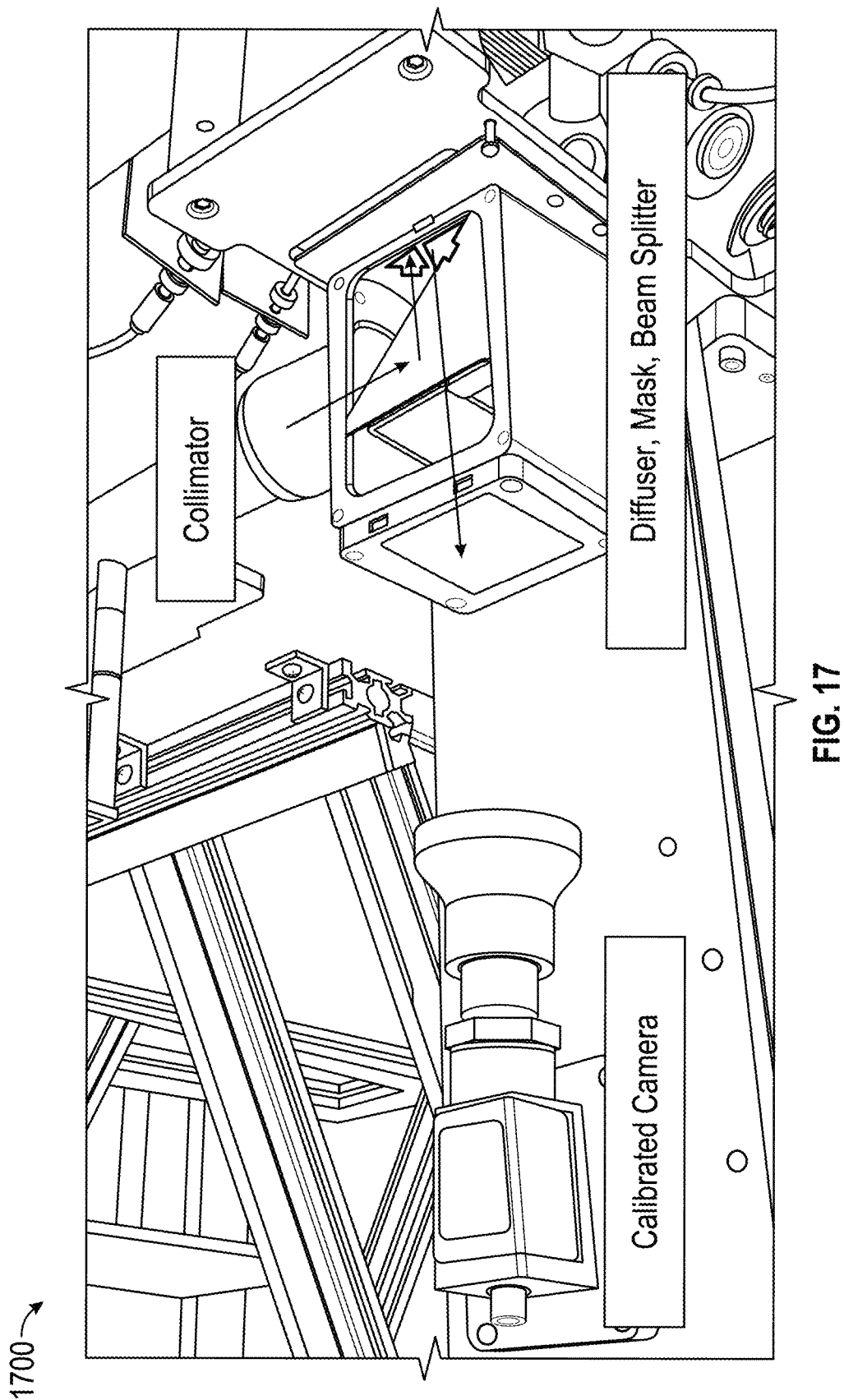
FIG. 17 is an image of an example configuration of the present wavefront sensor.

A wavefront sensor was constructed in accordance with FIG. 6. FIG. 17 is an image of the resulting example configuration 1700 of the present wavefront sensor. A collimator was used to collimate a laser beam that was directed onto a beamsplitter. The laser beam was generated using a commercial off the shelf (COTS) 532 nanometer CW laser source, and COTS collimating optics were used in a lens barrel to create a 50 mm beam diameter. The beamsplitter was a COTS 50/50 plate beamsplitter, 50×75 mm. The beamsplitter reflected the beam to a surface to be measured as described below, and then transmitted the light reflected by such surface to an aperture mask having the pattern illustrated in FIGS. 10A-10B. The mask was 50 mm×50 mm, chrome patterned on fused silica using photolithography. The apertures were about 250 μm in diameter with a center-to-center spacing of about 500 μm. The mask generated sub-beams of the incident light and projected spots onto a diffuser which was imaged by a calibrated camera. The camera was a COTS 20 MP GigE camera, using a COTS 25 mm focal length C-mount imaging lens. The digital images from the camera were processed on a computer running a MATLAB configured to implement operations such as described herein.

In one example, sensor 1700 measured the surface normal angles of flat λ/10 mirrors with an accuracy of <10 arc seconds. Measurements were validated with a theodolite, CMM (coordinate measuring machine), as well as a goniometer.

In other examples, mirrors with several microns of curvature were measured with the sensor configuration 1700. FIGS. 16A-16C illustrate wavefronts measured using the present wavefront sensor and using an interferometer for comparative purposes. The interferometer was a COTS Zygo laser interferometer. The measurements using wavefront sensor configuration 1700 matched the results of the interferometer within 5%, shown in FIGS. 16A-16C.

Additional Comments

From the foregoing, it will be appreciated that multiple aspects of the present subject matter alone or in combination provide for wavefront sensors having improved usability and dynamic range as compared to previously known sensors described with reference to FIGS. 1-4. For example, the present subject matter includes a hardware aspect. Such hardware aspect may include, but is not limited to, any suitable combination of one or more of the following: mask pattern, diffuser, and/or calibrated camera(s); collimated laser source; apparatus to store and correlate images and position data; and/or apparatus to perform image processing, wavefront calculation, and/or model fitting. Additionally, or alternatively, the present subject matter includes a method aspect. Such method aspect may include, but is not limited to, any suitable combination of one or more of the following: mask design, mask focal length, and/or imaging camera(s) parameters for desired application; and/or image processing algorithm for each measurement of incident light. Such algorithm may include any combination of one or more of the following: detect features in images; identify features, and determine displacements with their respective null positions; determine vectors represented by feature displacements; output vector field, mean vector, wavefront, and/or Zernike polynomials; and/or multiple wavefronts measured simultaneously.

Some variations of the present subject matter may include any suitable combination of one or more of the following: various encoded mask layouts; various imaging camera layouts (e.g., single camera vs multiple cameras); diffuser is ground glass (stationary vs moving, alternates); use as tilt sensor (similar to autocollimator); use as wavefront sensor (similar to Shack-Hartmann); sensor calibration with far-field simulator; mask aperture size, aperture spacing, and/or mask-diffuser spacing; denser is better, but too small may cause spots to blur; diffuser material-imaging camera and lens; scaling up for larger apertures; increase mask, diffuser, and/or camera FOV; and/or create array of sensors and stitch results together.

It is to be understood that any respective features/examples of each of the aspects of the disclosure as described herein may be implemented together in any appropriate combination, and that any features/examples from any one or more of these aspects may be implemented together with any of the features of the other aspect(s) as described herein in any appropriate combination to achieve the benefits as described herein.

While various illustrative examples are described above, it will be apparent to one skilled in the art that various changes and modifications may be made therein without departing from the invention. The appended claims are intended to cover all such changes and modifications that fall within the true spirit and scope of the invention.

What is claimed is:

1. A wavefront sensor for measuring a wavefront, comprising:
    an aperture mask configured to receive incident light, the aperture mask comprising a plurality of apertures irregularly spaced and arranged in a plurality of sub-windows that transmit sub-beams of the incident light;
    a diffuser configured to receive the sub-beams transmitted by the plurality of apertures;
    a controller configured to:
    identify measured sub-beams by convolving the sub-beams imaged on the diffuser with a map of the plurality of apertures; and
    measure the wavefront of the incident light based on changes in position of the sub-beams in a digital image of the diffuser relative to reference positions and neighboring sub-beams.

2. The wavefront sensor of claim 1, wherein the controller is configured to identify respective sub-beams in the digital image by a unique code.

3. The wavefront sensor of claim 1, further comprising: a source of collimated light having the wavefront.

4. The wavefront sensor of claim 3, wherein the source of collimated light comprises a laser.

5. The wavefront sensor of claim 3, further comprising:
a beamsplitter configured to reflect light from the source to a surface the wavefront from which is to be measured.

6. The wavefront sensor of claim 4, further comprising:
a beamsplitter configured to receive light that is reflected, diffused, or diffracted by a surface the wavefront from which is to be measured.

7. The wavefront sensor of claim 4, further comprising:
a beamsplitter configured to transmit such light which then is incident on the mask.

8. The wavefront sensor of claim 1, wherein the controller is configured to determine a null position of each sub-beam and calculate a displacement of each sub-beam from the null position.

9. The wavefront sensor of claim 1, further comprising:
a camera having a focal plane in which the diffuser is located, the camera being configured to obtain the digital image of the diffuser.

10. A method for measuring a wavefront using a wavefront sensor, comprising:
identifying measured sub-beams by convolving the sub-beams imaged on a diffuser of the wavefront sensor with a map of a plurality of apertures of an aperture mask of the wavefront sensor, the aperture mask configured to receive incident light and comprising the plurality of apertures that are irregularly spaced and arranged in a plurality of sub-windows that transmit sub-beams of the incident light, the diffuser configured to receive the sub-beams transmitted by the plurality of apertures; and
measuring the wavefront of the incident light based on changes in position of the sub-beams in a digital image of the diffuser relative to reference positions and neighboring sub-beams.

11. The method of claim 10, further comprising: generating collimated light having the wavefront.

12. The method of claim 11, wherein a source of collimated light comprises a laser.

13. The method of claim 10, further comprising: using a beamsplitter to reflect light from a source to a surface the wavefront from which is to be measured.

14. The method of claim 10, further comprising: using a beamsplitter to receive light that is reflected, diffused, or diffracted by the surface the wavefront from which is to be measured.

15. The method of claim 10, wherein the measuring the wavefront comprises detecting sub-beam centroids in the digital image.

16. The method of claim 10, wherein the measuring the wavefront comprises undistorting sub-beam centroids in the digital image using an intrinsic camera calibration.

17. The method of claim 10, wherein measuring the wavefront comprises measuring a tilt of the incident light.

18. The method of claim 10, wherein measuring the wavefront comprises measuring a wavefront error of the incident light.

19. The method of claim 10, wherein measuring the wavefront comprises determining a null position of each sub-beam and calculating each a displacement of each sub-beam from its null position.

* * * * *